(12) United States Patent
Aoyama

(10) Patent No.: US 7,920,349 B2
(45) Date of Patent: Apr. 5, 2011

(54) PHASE ADJUSTING DEVICE, MAGNETIC STORAGE MEDIUM, AND STORAGE DEVICE

(75) Inventor: Nobuhide Aoyama, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 231 days.

(21) Appl. No.: 12/408,254

(22) Filed: Mar. 20, 2009

(65) Prior Publication Data

US 2009/0296255 A1 Dec. 3, 2009

(30) Foreign Application Priority Data

Jun. 3, 2008 (JP) ................................ 2008-145982

(51) Int. Cl.
*G11B 5/09* (2006.01)
(52) U.S. Cl. ............................................ 360/51; 360/48
(58) Field of Classification Search .................... None
See application file for complete search history.

(56) References Cited

U.S. PATENT DOCUMENTS

| 6,738,207 B1 * | 5/2004 | Belser et al. ..................... 360/31 |
| 7,675,703 B2 * | 3/2010 | Albrecht et al. ................. 360/51 |
| 2010/0118426 A1 * | 5/2010 | Vikramaditya et al. ......... 360/51 |

FOREIGN PATENT DOCUMENTS

JP         A 8-36839        2/1996

* cited by examiner

*Primary Examiner* — Daniell L Negrón
*Assistant Examiner* — Regina N Holder
(74) *Attorney, Agent, or Firm* — Greer, Burns & Crain, Ltd.

(57) ABSTRACT

A magnetic storage medium such as a BPM includes a plurality of magnetic dots for writing and reproducing data disposed in a magnetically separated manner so as to be spaced a predetermined distance in a down-track direction and a plurality of tracks concentrically disposed so that the magnetic dots are disposed in a magnetically separated manner. In the BPM, a phase-adjusting track is disposed in an arbitrary track among the tracks. On the phase-adjusting track, phase detection dots disposed in a down-track direction to allow writing and reproduction of phase detection data and blank bits providing a predetermined phase difference in a down-track direction to next successive phase-detecting dots are alternately disposed in a successive manner.

8 Claims, 17 Drawing Sheets

PHASE ADJUSTING DEVICE, MAGNETIC STORAGE MEDIUM, AND STORAGE DEVICE

CROSS-REFERENCE TO RELATED APPLICATION(S)

This application is based upon and claims the benefit of priority of the prior Japanese Patent Application No. 2008-145982, filed on Jun. 3, 2008, the entire contents of which are incorporated herein by reference.

FIELD

The embodiment(s) discussed herein is (are) directed to a phase adjusting device, magnetic storage medium, and storage device having a function of determining an optimum phase-adjusting amount for matching a data write timing with magnetic storage media, such as bit patterned media (BPM).

BACKGROUND

For example, a hard disk drive as a storage device is used as a storage device for a personal computer or a hard disk drive (HDD) recorder. The storage (or recoding) density of the hard disk is currently increasing year after year.

Thus, in recent years, a vertical (or perpendicular) magnetic recording technique is adopted in place of a longitudinal recording technique, thereby further increasing the storage density.

Also, to further increase the storage density, research and development of various media, such as BPM, have been actively conducted.

FIG. 17 is a schematic drawing for briefly explaining a track structure inside of a general BPM.

A BPM 100 depicted in FIG. 17 has a plurality of magnetic dots 101 disposed in a magnetically separated manner each with a predetermined space in a down-track direction (bit-length direction) to allow data to be written or allow written data to be reproduced with application of a magnetic field, and also has a plurality of tracks 102 disposed in a magnetically separated manner in a cross-track direction orthogonal to the down-track direction.

The BPM 100 has a configuration in which the magnetic dots 101 are disposed in a magnetically separated manner each with the predetermined space in the down-track direction and the cross-track direction. Therefore, as for the down-track direction, side erase to an adjacent track 102 can be prevented. As for the cross-track direction, the bit density is increased, thereby significantly increasing the storage density.

Also, in the conventional HDD device, in place of using BPM, a technology is known as a method of resolving a phase shift (or phase error) in write timing, in which a write-once magnetic storage medium is implemented and a clock-correcting successive pattern is additionally written for clock correction (for example, see Japanese Laid-open Patent Publication No. 08-36839).

However, in the magnetic storage media, such as BPM, the magnetic dots 101 for writing or reproducing data are disposed in a magnetically separated manner in the down track direction and the cross-track direction and taken as a fixed pattern. Therefore, if a phase shift occurs in write timing with respect to the magnetic dots 101, different data may be written in the magnetic dots 101 adjacent in the down-track direction.

SUMMARY

According to an aspect of an embodiment, a phase adjusting device includes a rotation drive controlling unit that drives a magnetic storage medium for rotation, the magnetic storage medium having a plurality of magnetic dots disposed along a down-track direction in a magnetically separated manner and phase-detecting dots and blank bits alternately disposed along a phase-adjusting track provided between adjacent lines of the magnetic dots in a cross-track direction to provide a predetermined phase difference in the down-track direction; a magnetic-head drive controlling unit that adjusts and controls a write timing and a reproduction timing of a magnetic head unit with respect to the magnetic dots of the magnetic storage medium; a position-information managing unit that manages position information of the phase-detecting dots in the phase-adjusting track; a write controlling unit that, upon detecting a phase-detection start signal, starts writing of phase detection data by repeatedly reversing a magnetizing direction with a predetermined period of dot counts on the phase-adjusting track via the magnetic head unit and manages a write start position thereof; a reproduction controlling unit that, after the phase detection data is written, reproduces and outputs the phase detection data written in the phase-detecting dots on the phase-adjusting track in accordance with a reproduction timing of the magnetic head unit at the write start position; a reproduction-output-waveform obtaining unit that obtains a reproduction output waveform of the phase detection data written in the phase-detecting dots on the phase-adjusting track reproduced and output by the reproduction controlling unit; a maximum-output-pattern detecting unit that detects an output pattern with a maximum peak at a minus side and a plus side of the reproduction output waveform obtained by the reproduction-output-waveform obtaining unit; a zero-cross-position detecting unit that detects a zero-cross position regarding the output pattern of the maximum peak detected by the maximum-output-pattern detecting unit; and an optimum-phase-adjustment-amount determining unit that determines an optimum phase-adjusting amount for matching a phase of the write timing of the magnetic head unit with respect to the magnetic dots of the magnetic storage medium based on the zero-cross position detected by the zero-cross-position detecting unit and the position information of the phase-detecting dots managed by the position-information managing unit.

According to another aspect of an embodiment, a magnetic storage medium includes a plurality of magnetic dots disposed along a down-track direction in a magnetically separated manner; and phase-detecting dots and blank bits alternately disposed along a phase-adjusting track provided between adjacent lines of the magnetic dots in a cross-track direction to provide a predetermined phase difference in the down-track direction.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Based on the drawings, embodiments of the phase adjusting device, the magnetic storage medium, and storage device according to the present invention are explained in detail below.

First, a general outline of the present embodiments is explained. That is, even with a BPM in which a plurality of magnetic dots are disposed in a magnetically separate manner in a down-track direction and a cross-track direction, an optimum phase adjusting amount for matching the phase of write timing of a magnetic head unit with respect to the magnetic dots can be determined. As a result, a phase shift or phase error in write timing with respect to the magnetic dots on the BPM can be resolved, thereby increasing write accuracy.

Figure 1:
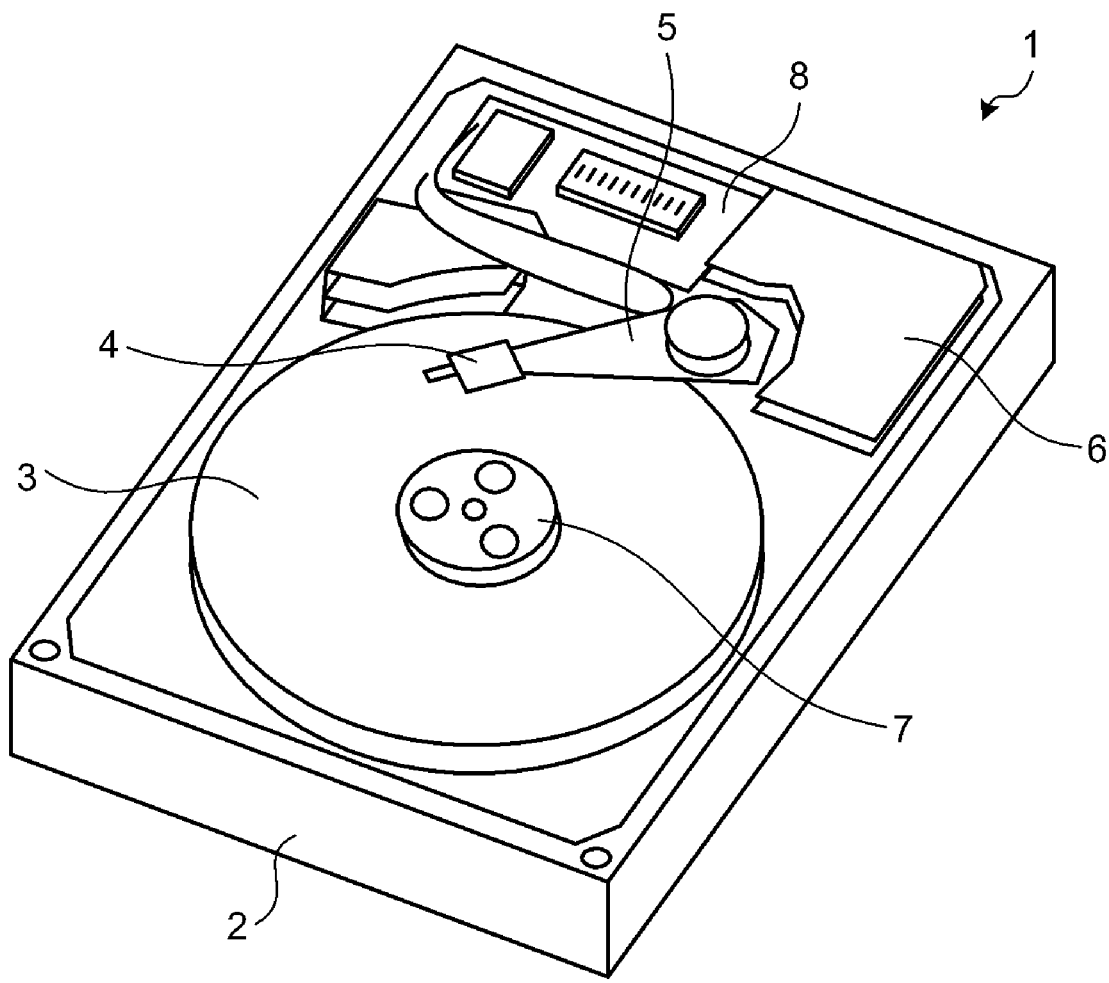
FIG. 1 is a perspective view of a schematic configuration of an HDD device according to a first embodiment.

FIG. 1 is a perspective view of a schematic configuration of an HDD device according to a first embodiment.

An HDD device 1 depicted in FIG. 1 has a BPM 3 implemented on a base body 2 to write data in the BPM 3 and reproduce data written in the BPM 3.

The HDD device 1 includes a magnetic head unit 4 that writes and reproduces data with respect to magnetic dots on the tracks of the implemented BPM 3 and a suspension member 5 that suspends the magnetic head unit 4 in a tracking direction of the BPM 3.

Also, the HDD device 1 includes a voice coil motor 6 that moves the magnetic head unit 4 via the suspension member 5 in the tracking direction of the BPM 3, a spindle motor 7 that drives the BPM 3 for rotation at a predetermined rotation speed, and a control circuit 8 that controls the entire HDD device 1.

Figure 2:
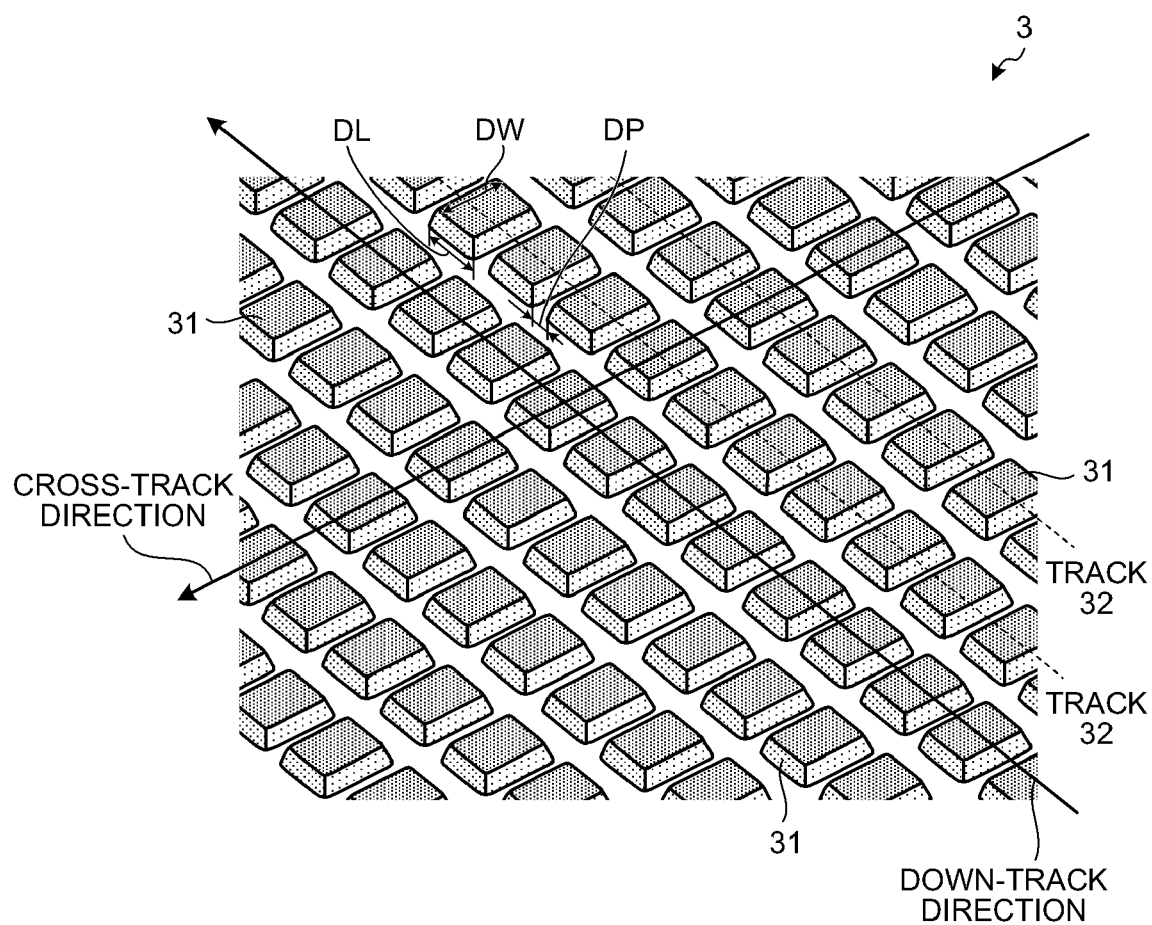
FIG. 2 is a schematic drawing briefly depicting the arrangement structure of tracks on a BPM implemented in the HDD device.

FIG. 2 is a schematic drawing briefly depicting the arrangement structure of tracks on the BPM 3 implemented in the HDD device 1.

The BPM 3 depicted in FIG. 2 has a plurality of magnetic dots 31 disposed in a magnetically separated manner in a down-track direction (bit-length direction) to write and reproduce data and a plurality of tracks 32 that make the magnetic dots 31 disposed in a magnetically separated manner in a cross-track direction orthogonal to the down-track direction.

A dot length DL of each of the magnetic dots 31 in the down-track direction is approximately 30 nanometers, a dot width DW of the magnetic dot 31 in the cross-track direction is approximately 40 nanometers, and a space DP between adjacent magnetic dots 31 in the down-track direction is approximately 15 nanometers.

Figure 3:
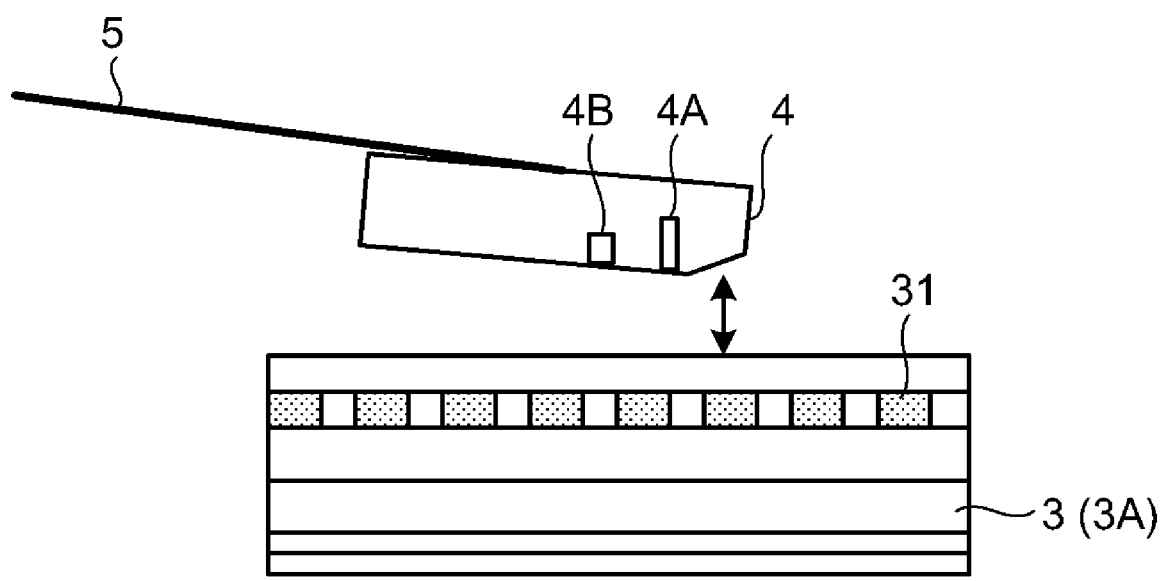
FIG. 3 is a drawing for briefly explaining an access to the BPM of a magnetic head unit of the HDD device.

FIG. 3 is a drawing for briefly explaining an access to the BPM 3 of the magnetic head unit 4 of the HDD device 1.

As depicted in FIGS. 2 and 3, the magnetic head unit 4 includes a recording element 4A made of FeCo as a main-pole material having a high-saturated magnetic flux density, the recording element 4A that applies a magnetic field on the magnetic dots 31 on the tracks 32 of the BPM 3 to change a magnetizing direction of the magnetic dots 31, thereby writing data in the magnetic dots 31. The magnetic head unit 4 also includes a reproducing element 4B of tunneling magneto resistivity (TMR) that reproduces data from the magnetic dots 31 and servo patterns (not shown) in the tracks 32.

The magnetic head unit 4 stably floats with a floating amount of several nanometers over the BPM 3 via the suspension member 5.

Figure 4:
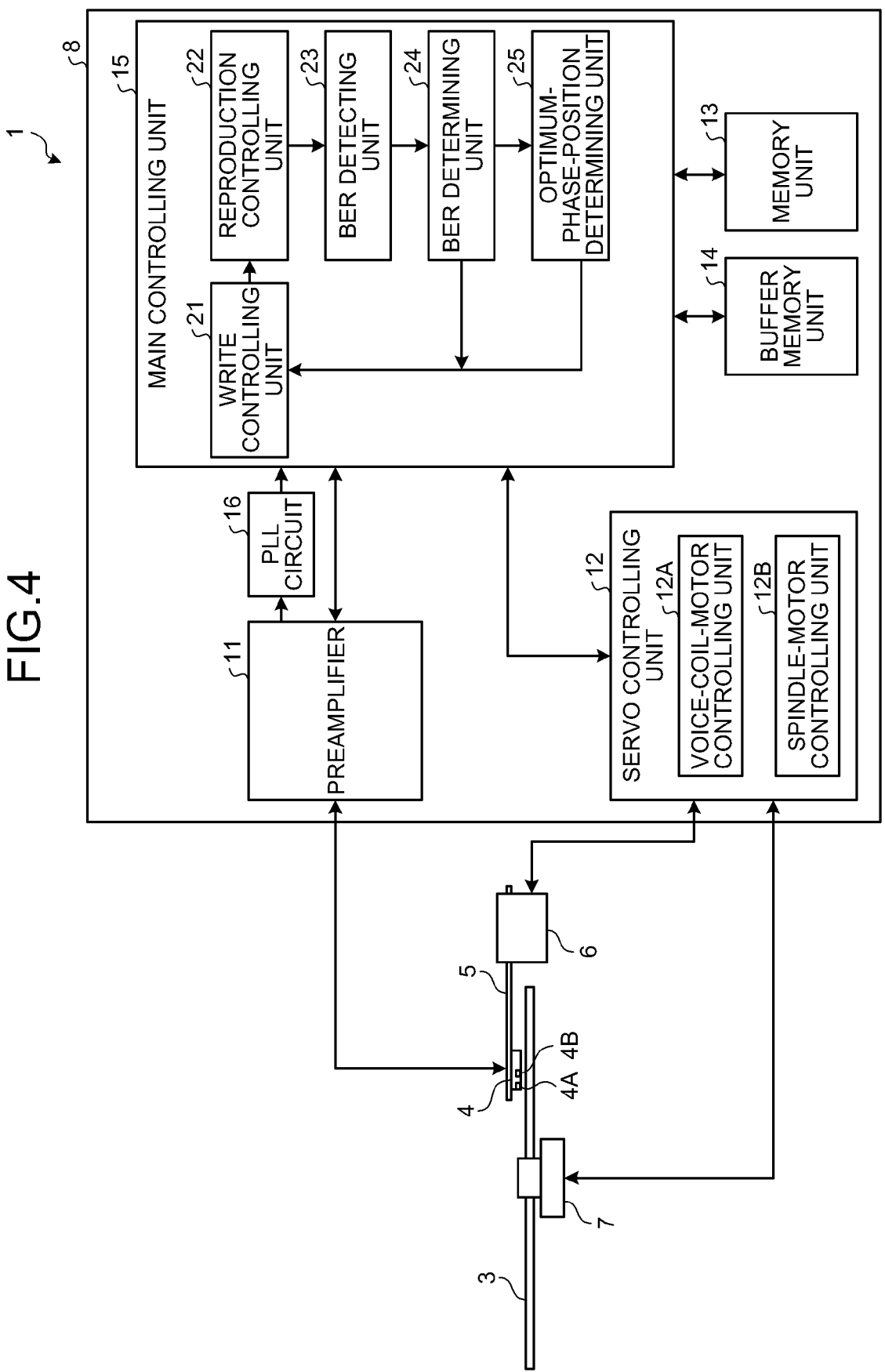
FIG. 4 is a block diagram of a schematic configuration of the inside of the HDD device.
Figure 5:
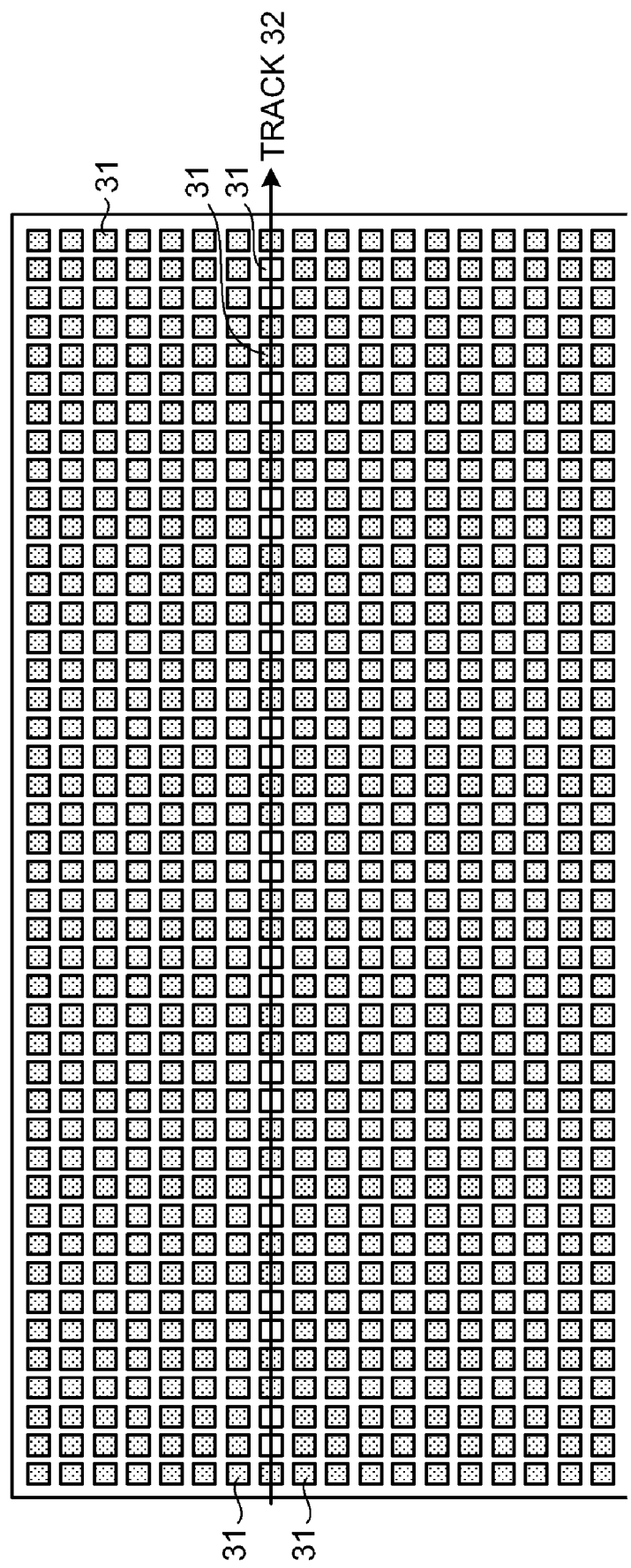
FIG. 5 is a drawing for briefly explaining an operation of writing phase detection data in tracks of the BPM implemented in the HDD device.

FIG. 4 is a block diagram of a schematic configuration of the inside of the HDD device 1. FIG. 5 is a drawing for briefly explaining an operation of writing phase detection data in the tracks 32 of the BPM 3 implemented in the HDD device 1.

A control circuit 8 depicted in FIG. 4 includes a preamplifier 11 that performs signal processing when data is written in or the written data is reproduced from the magnetic dots 31 on the tracks 32 of the BPM 3 via the magnetic head unit 4, a servo controlling unit 12 that drives and controls the voice coil motor 6 and the spindle motor 7, a memory unit 13 that stores various information, a buffer memory unit 14 that temporarily stores various information, and a main controlling unit 15 that controls the entire control circuit 8.

Also, the control circuit 8 includes a phase locked loop (PLL) circuit 16 that obtains a reference clock from a reproduction signal from the BPM 3 via the preamplifier 11.

The servo controlling unit 12 includes a voice-coil-motor controlling unit 12A that drives and controls the voice coil motor 6 and a spindle-motor controlling unit 12B that drives and controls the spindle motor 7.

Also, the main controlling unit 15 includes a write controlling unit 21 and a reproduction controlling unit 22. When a phase-detection start signal for matching a write timing and a reproduction timing with respect to the magnetic dots 31 is detected, the write controlling unit 21 writes phase detection data in the magnetic dots 31 on the track 32 through the recording element 4A. After the phase detection data is written, the reproduction controlling unit 22 reproduces and outputs the data in accordance with the reproduction timing at a write start position through the reproducing element 4B.

Furthermore, the main controlling unit 15 includes a bit-error-rate (BER) detecting unit 23, a BER determining unit 24, and an optimum-phase-position determining unit 25. The BER detecting unit 23 detects a BER from the reproduction output from the reproduction controlling unit 22. The BER determining unit 24 determines whether the current BER detected by the BER detecting unit 23 is greater than a stored BER and, when the current BER is greater than the stored BER, stores the BER as a maximum BER and a write start position regarding the maximum BER. The optimum-phase-position determining unit 25 determines an optimum phase position based on the determination result by the BER determining unit 24.

When a phase-detection start signal is detected, as depicted in FIG. 5, the write controlling unit 21 writes phase detection data with repeated reversals in a magnetizing direction with a predetermined period of dot counts, for example, a two-dot period, from a write start position of the magnetic dots 31 on an arbitrary one of the tracks 32 to the down-track direction, and stores the write start position.

After the phase detection data is written, the reproduction controlling unit 22 reproduces and outputs the phase detection data written in the magnetic dots 31 from the write start position.

Furthermore, the BER detecting unit 23 detects a BER for each write start position from the reproduction output from the reproduction controlling unit 22.

When a BER of a reproduction output regarding the write start position is detected by the BER detecting unit 23 and the current BER is greater than the stored BER, the BER determining unit 24 stores the BER as a maximum BER and a write start position regarding the maximum BER.

Also, after the determination process by the BER determining unit 24, the write controlling unit 21 divides the dot length DL of the magnetic dot 31 into sixteen, and sequentially shifts the write start position in units of $1/16$ in the down-track direction.

The write controlling unit 21 sequentially shifts the write start position in units of $1/16$ of the dot length DL to sequentially write the phase detection data, and sequentially stores the write start position.

Every time the write controlling unit 21 sequentially shifts the write start position to sequentially write the phase detection data, the reproduction controlling unit 22 reproduces and outputs the written phase detection data, and causes operations of the BER detecting unit 23 and the BER determining unit 24 to be sequentially performed on the reproduction output of the phase detection data written for each write start position.

Figure 6:
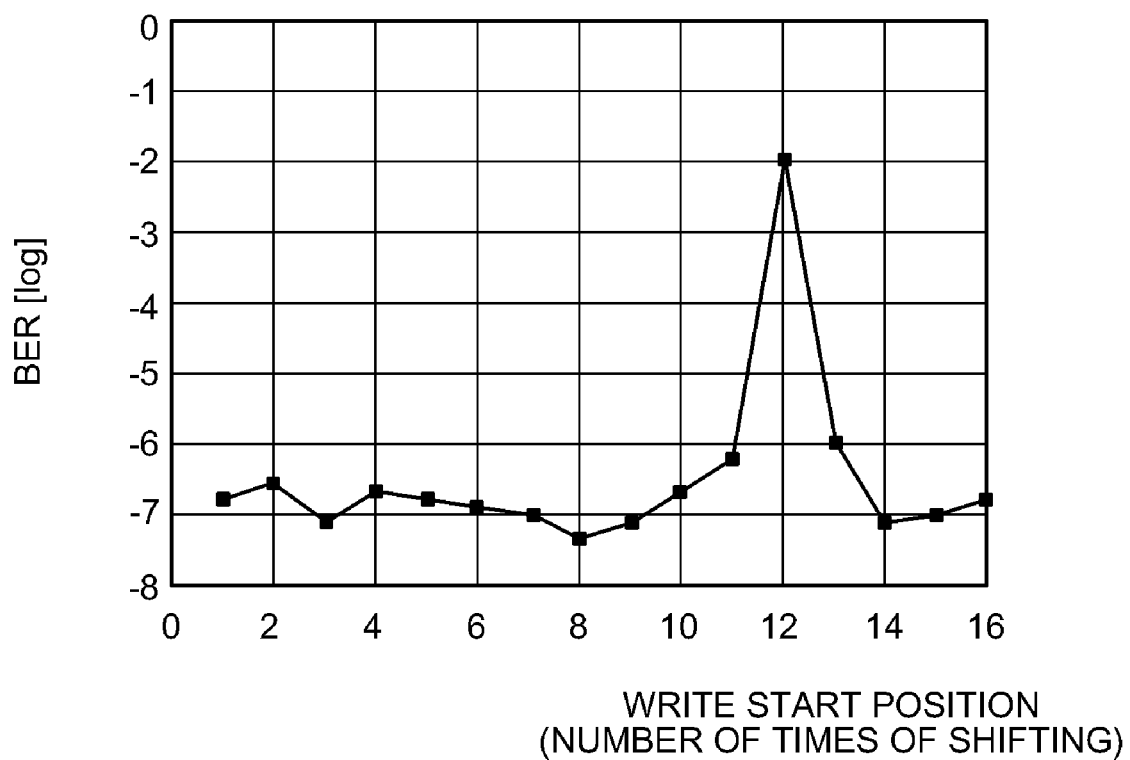
FIG. 6 is a drawing for briefly explaining a BER for each write start position of the HDD device.

FIG. 6 is a drawing for briefly explaining a BER for each write start position of the HDD device 1.

The reproduction controlling unit 22 reproduces and outputs the phase detection data for each write start position shifted in units of $1/16$ of the dot length DL of the magnetic dot 31 to cause the BER detecting unit 23 to detect a BER for the reproduction output for each write start position.

Furthermore, among BERs regarding reproduction outputs of all write starts positions, that is, write start positions with the maximum number of times of shifting N=16, the BER determining unit 24 stores and retains the maximum BER and the write start position regarding the maximum BER.

Here, in the example of FIG. 6, a BER of a "twelfth" write start position with the dot length DL being shifted by $12/16$ of the dot length DL from an initial write start position is taken as a maximum BER, and this maximum BER and the write start position of the maximum BER are stored and retained.

Also, when the BER determining unit 24 stores and retains the maximum BER and the "twelfth" write start position regarding the maximum BER among the BERs regarding the reproduction outputs of all write start positions, that is, sixteen write start positions, of the optimum-phase-position determining unit 25, the optimum-phase-position determining unit 25 determines as an optimum phase position a write start position obtained by shifting N/2 times (N=16) around the write start position regarding the maximum BER, that is, by shifting eight times forward or backward from the write start position regarding the maximum BER, that is, a write start position of (12-8)/16 of the dot length DL, that is, a "fourth" write start position obtained by shifting $4/16$ of the dot length DL form the initial write start position.

Figure 7:
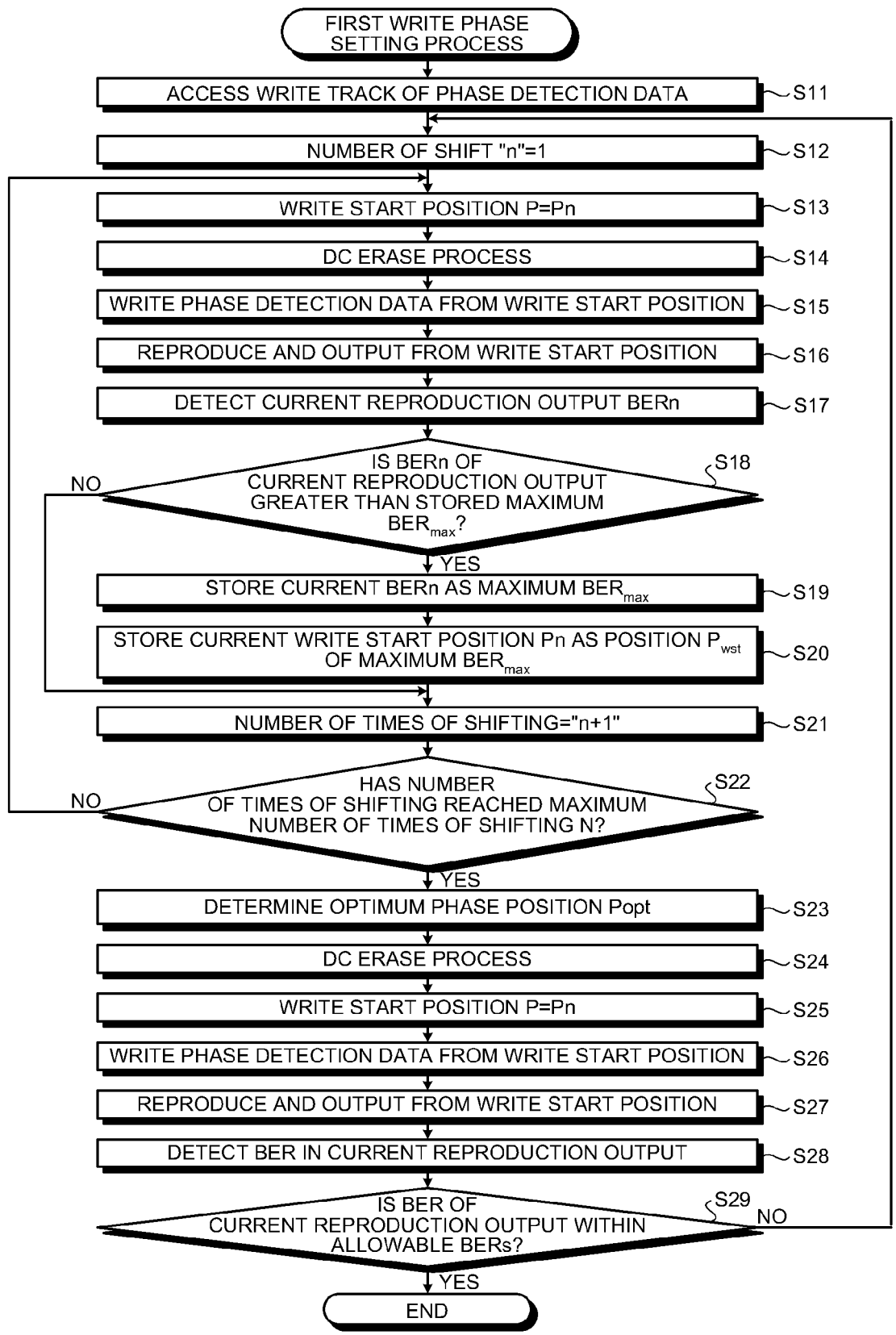
FIG. 7 is a flowchart of the operation of a control circuit of the HDD device involving in a first write phase setting process.

Next, the operation of the HDD device 1 according to the first embodiment is explained. FIG. 7 is a flowchart of the operation of the control circuit 8 of the HDD device 1 of the first embodiment involving in a first write phase setting process.

In the first write phase setting process depicted in FIG. 7, the write start position is sequentially shifted in units of $1/16$ of the dot length DL of the magnetic dot 31 in the down-track direction of an arbitrary one of the tracks 32 on the BPM 3. Based on the BER of the reproduction output regarding the write start position, the optimum phase position is determined. At this optimum phase position, the phase of the write timing of the magnetic head unit 4 is matched.

In FIG. 7, when a phase-detection start signal is detected, the write controlling unit 21 of the control circuit 8 access a write start position of an arbitrary one of the tracks 32 based on the servo pattern on the BPM 3 so as to write the phase detection data (Step S11).

It is assumed herein that the setting environment of the HDD device 1 is such that the number of revolutions is 5400 revolutions per minute, the radius position is 19.68 millimeters, the peripheral speed is 11.13 m/sec, the skew angle is 0 degrees, and the recording frequency is 12.7 MFluxChange/sec.

When setting the number of times of shifting n in units of $1/16$ of the dot length DL of the magnetic dot 31 from the initial write start position as an initial value of "1" (Step S12), the write controlling unit 21 sets a write start position P as a current write start position Pn (Step S13).

Furthermore, the write controlling unit 21 performs a DC (direct current) erase process of making a direction of magnetizing the magnetic dots 31 in one direction (magnetic flux upward or magnetic flux downward) from the write start position (Step S14).

Upon performing the DC erase process, the write controlling unit 21 writes phase detection data from the write start position (Step S15). Here, the phase detection data is data in which the direction of magnetizing the magnetic dots 31 is repeatedly reversed with a two-dot period, as depicted in FIG. 5.

When the write controlling unit 21 ends writing of the phase detection data from the write start position, the reproduction controlling unit 22 reproduces and outputs the phase detection data written from the write start position (Step S16).

The BER detecting unit 23 then detects a BERn from a current reproduction output of the phase detection data through the reproduction controlling unit 22 (Step S17).

The BER determining unit 24 determines whether the BERn of the current reproduction output is greater than the stored maximum $BER_{max}$ (Step S18).

When the BERn of the current reproduction output is greater than the stored maximum $BER_{max}$ (Yes at Step S18) the BER determining unit 24 stores the current BER as a maximum $BER_{max}$ (Step S19), and also stores the current write start position Pn as a maximum BER position Pwst of the maximum $BER_{max}$ (Step S20).

The write controlling unit 21 then increments the number of times of shifting n by +1, that is, shifts the write start position in units of 1/16 of the dot length DL in the down-track direction (Step S21), and determines whether the number of times of shifting n reaches a maximum number of times of shifting N (N=16) (Step S22).

When the number of times of shifting n does not reach a maximum number of times of shifting N (No at Step S22) the write controlling unit 21 proceeds to Step S13 so as to set the write start position P obtained by shifting once by units of 1/16 of the dot length DL at Step S21 as a current write start position Pn.

Also, when the number of times of shifting n reaches the maximum number of times of shifting N (Yes at Step S22), the optimum-phase-position determining unit 25 determines that a BER decision regarding the reproduction outputs at all sixteen write start positions by a total of sixteen times of shifting has ended, and then determines as an optimum phase position a write start position obtained by shifting N/2=16/2=eight times around the maximum BER and the write start position of the maximum BER stored in the BER determining unit 24 forward or backward from that write start position within a shift allowable range (Step S23).

In the example depicted in FIG. 6, when BERs of the reproduction output of sixteen write start positions are detected and the write start position of the maximum BER is a "twelfth" write start position obtained by shifting 12/16 of the dot length DL from the initial write start position, with the write start position of the maximum BER being taken as a center, a write start position obtained by shifting eight times forward or backward from the write start position within the shift allowable range, that is, the fourth write start position from the initial write start position, is determined as an optimum phase position.

When the optimum phase position is determined by the optimum-phase-position determining unit 25, the write controlling unit 21 matches the phase of the write timing of the magnetic head unit 4 with the optimum phase position, and performs a DC erase process with the optimum phase position being taken as a write start position (Step S24).

Upon performing a DC erase process, the write controlling unit 21 sets the optimum phase position as a current write start position Pn (Step S25), and then writes the phase detection data from that write start position (Step S26).

Furthermore, when the operation of writing the phase detection data from the write start position ends, the reproduction controlling unit 22 reproduces and outputs the phase detection data written in the write start position (Step S27).

The BER detecting unit 23 detects a BER of a reproduction output of the phase detection data written at the write start position (Step S28).

The write controlling unit 21 determines whether a BER of the current reproduction output is within allowable BERs (Step S29). The allowable BERs correspond to BERs allowable at the time of normal reproduction.

When the BER of the current reproduction output is within the allowable BERs (Yes at Step S29), the write controlling unit 21 ends the process operation depicted in FIG. 7.

On the other hand, when the BER of the current reproduction output is not within the allowable BERs (No at Step S29), the write controlling unit 21 proceeds to Step S12 to determine an optimum phase position again.

Also, when it is determined at Step S18 that the BERn of the current reproduction output is not greater than the stored maximum $BER_{max}$ (No at Step S18), the BER determining unit 24 proceeds to Step S21 to increment the number of times of shifting n by +1 and shift the write start position once in units of 1/16 of the dot length DL.

In the first write phase setting process depicted in FIG. 7, the write start position is sequentially shifted in units of 1/16 of the dot length DL in the down-track direction, the phase detection data is written for each write start position, the written phase detection data is reproduced and output, a BER of the reproduction output is detected, a write start position of a maximum BER is determined among BERs of the phase detection data written in all write start positions, and a write start position obtained by shifting eight times forward or backward from the write start position within a shift allowable range with the write start position of the maximum BER being taken as a center is determined as an optimum phase position. As a result, even with the BPM 3, the HDD device 1 can match the phase of the write timing of the magnetic head unit 4 with the optimum phase position to resolve a phase shift with respect to the write timing, thereby increasing write accuracy.

In the first embodiment, the write start position is sequentially shifted in units of a predetermined fraction of the dot length DL in the down-track direction, the phase detection data is written for each write start position, the written phase detection data is reproduced and output, a BER of the reproduction output is detected, a write start position of a maximum BER is determined among BERs of the phase detection data written in all write start positions, and a write start position obtained by shifting half of the maximum number of times of shifting N forward or backward from the write start position within a shift allowable range with the write start position of the maximum BER being taken as a center is determined as an optimum phase position. As a result, even with the BPM 3, the HDD device 1 can match the phase of the write timing of the magnetic head unit 4 with the optimum phase position to resolve a phase shift with respect to the write timing, thereby increasing write accuracy.

In the first embodiment, the write start position is sequentially shifted in units of 1/16 in the down-track direction, the phase detection data is written for each write start position, the written phase detection data is reproduced and output, a BER of the reproduction output is detected, a write start position of a maximum BER is determined among BERs of the phase detection data written in all write start positions, and an optimum phase position is determined with the write start position of the maximum BER being taken as a center. However, since the write start position has to be sequentially shifted and the phase detection data has to be written and reproduced for each write start position obtained through sequential shifting, a significant amount of process load is required.

Figure 8:
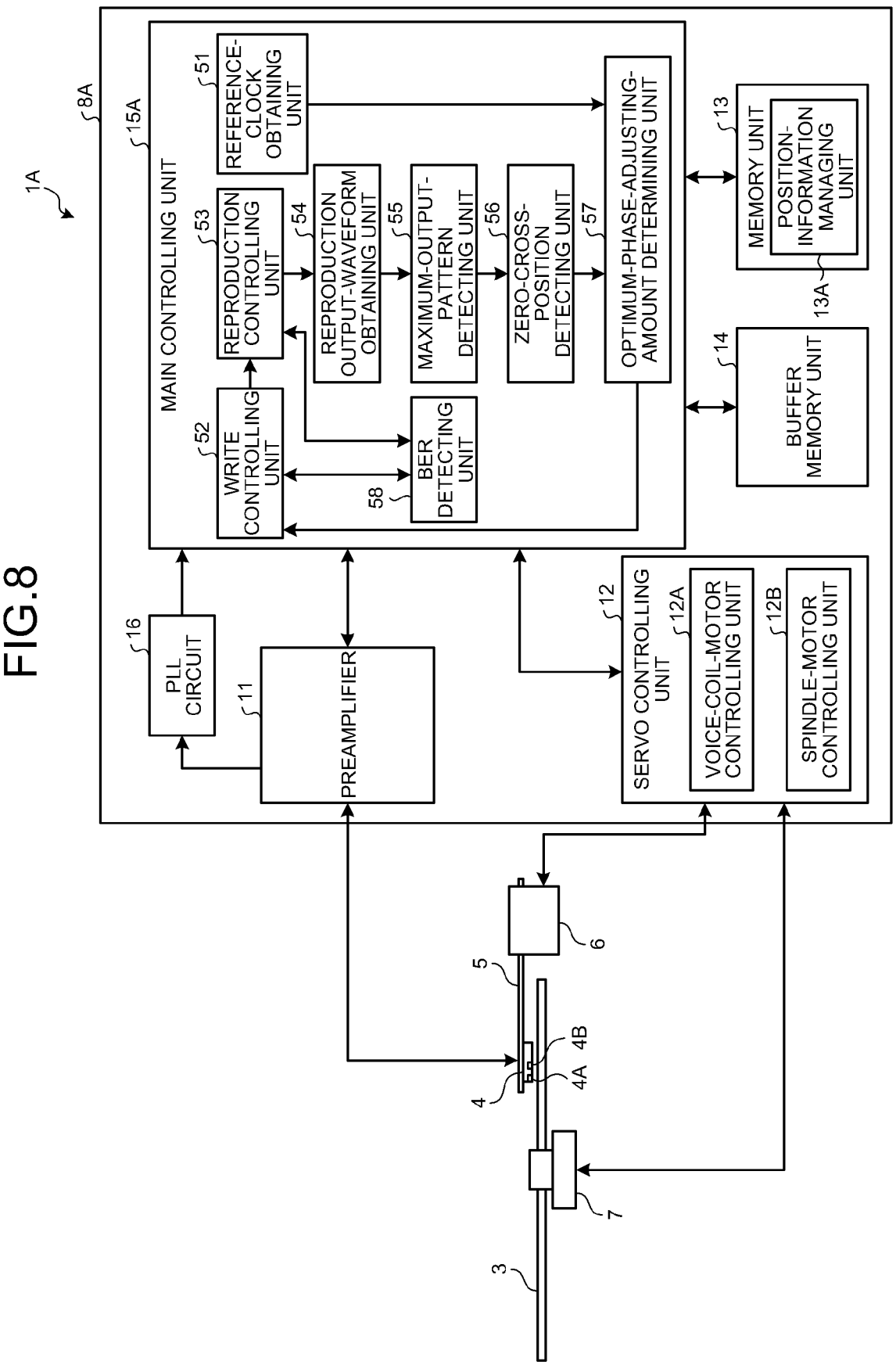
FIG. 8 is a block diagram of a schematic configuration of the inside of an HDD device according to a second embodiment.
Figure 9:
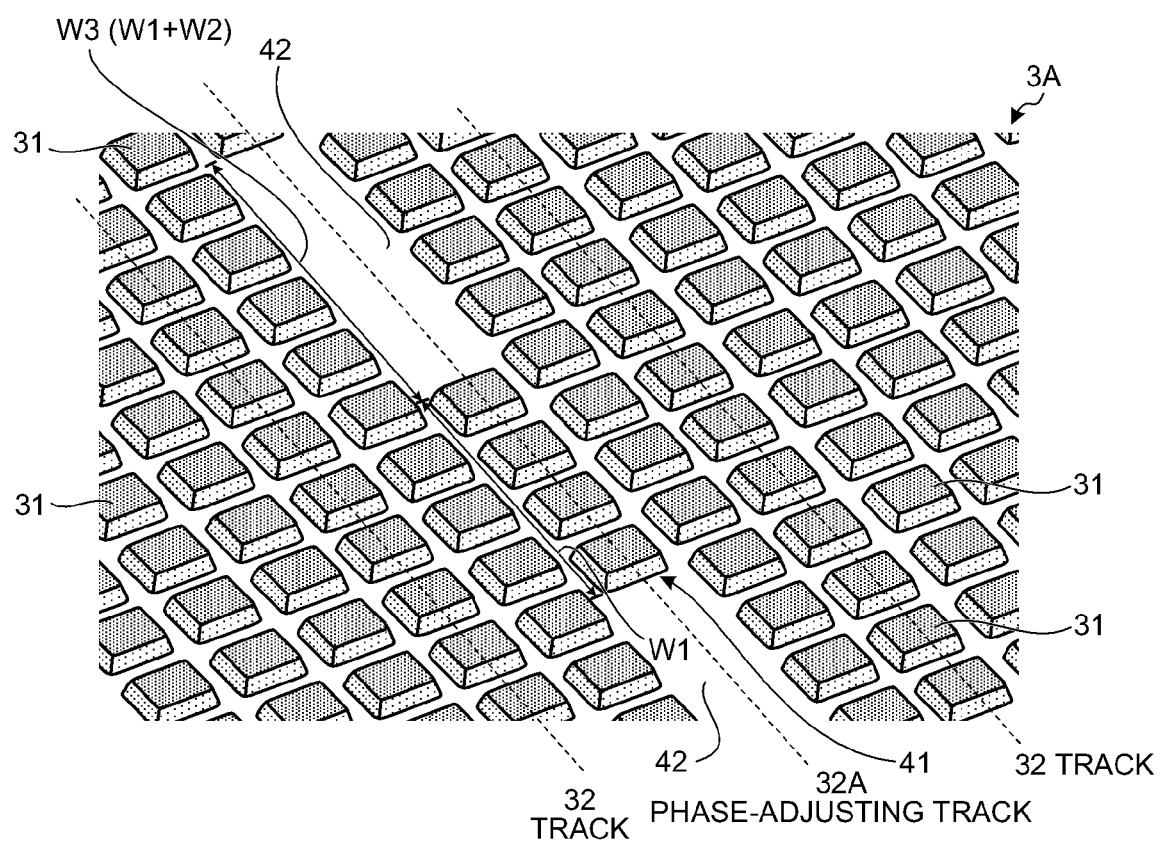
FIG. 9 is a schematic diagram briefly depicting the arrangement structure of tracks on a BPM implemented in the HDD device.
Figure 10:
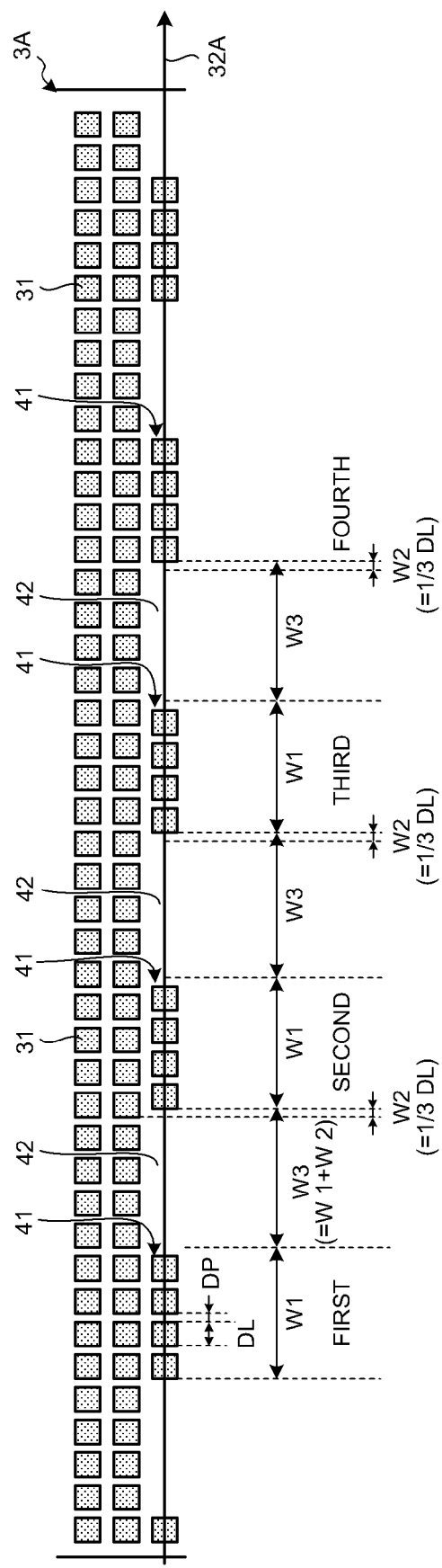
FIG. 10 is a drawing for briefly explaining main parts of a phase-adjusting track on the BPM.

An HDD device to resolve such a process load is explained below as a second embodiment. FIG. 8 is a block diagram of a schematic configuration of the inside of the HDD device according to the second embodiment. FIG. 9 is a schematic diagram briefly depicting the arrangement structure of tracks on a BPM implemented in the HDD device. FIG. 10 is a drawing for briefly explaining main parts of phase-adjusting tracks on the BPM. Here, components identical to those in the HDD device 1 according to the first embodiment are provided with the same reference numerals, and their redundant configuration and operation are not explained herein.

The HDD device 1 according to the first embodiment and an HDD device 1A according to the second embodiment are different in that, as depicted in FIGS. 8 to 10, a BPM 3A is implemented, in which a phase-adjusting track 32A is disposed on an arbitrary one of the tracks 32 for determining an optimum phase adjusting amount for use in phase adjustment of the write timing with respect to the magnetic dots 31.

The phase-adjusting track 32A has phase detection dots 41 disposed in the down-track direction allowing the phase detection data to be written and reproduced and blank bits 42 providing a predetermined phase difference in the down-track direction to next successive phase detection dots 41 in a successive manner.

As depicted in FIG. 10, the phase detection dots 41 are formed of a predetermined number, for example, four magnetic dots 31 in the down-track direction with respect to the predetermined space DP. Here, a distance W1 corresponding to the length of the phase detection dots 41 in the down-track direction is calculated by, for example, (the dot length DL of the magnetic dot 31+ the predetermined space DP)×the number of magnetic dots m (m=4).

Also, the blank bits 42 takes a distance W3 obtained by adding a distance W1 corresponding to the length of the phase detection dots 41 in the down-track direction and a distance W2 corresponding to a predetermined fraction, for example, ⅓, of the dot length DL of the magnetic dot 31 in the down-track direction together as a length of each blank bit 42 in the down-track direction, and provides a phase difference corresponding to ⅓ of the dot length DL in the down-track direction to next successive phase detection dots 41.

As a result, the phase-adjusting track 32A has an arrangement structure in which, when arbitrary ones of the phase detection dots 41 are taken as first phase detection dots 41, a phase difference corresponding to the distance W2, which is ⅓ of the dot length DL of the magnetic dot 31, occurs over the first to second phase detection dots 41, a phase difference corresponding to a distance (W2+W2) which is ⅔ of the dot length of the magnetic dot 31, occurs over the first to third phase detection dots 41, and a phase difference corresponding to a distance (W2+W2+W2=DL), which is 3/3 of the dot length of the magnetic dot 31, occurs over the first to fourth phase detection dots 41.

Also, the phase-adjusting track 32A has the phase detection dots 41 and the blank bits 42 alternately disposed in a successive manner. Prior to the first phase detection dots 41, as depicted in FIG. 12, reference-clock obtaining dots 43 are disposed for obtaining a reference clock.

The memory unit 13 in the control circuit 8 depicted in FIG. 8 includes a position-information managing unit 13A that manages position information of the magnetic dots 31 in the tracks 32 on the BPM 3A and also manages the position information of the phase detection dots 41 in the phase adjusting track 32A.

Also, a main controlling unit 15A in the control circuit 8 includes, as depicted in FIG. 8, a reference-clock obtaining unit 51 that obtains a reference clock from the PLL circuit 16, a write controlling unit 52 that, when a phase-detection start signal is detected, starts writing of the phase detection data with repeated reversals of the magnetizing direction with a predetermined period of dot counts, for example, a two-dot period, on the phase-adjusting track 32A via the magnetic head unit 4, and a reproduction controlling unit 53 that, after the phase detection data is written, starts a reproducing operation by matching the reproduction timing of the magnetic head unit 4 with the write start position.

Figure 12:
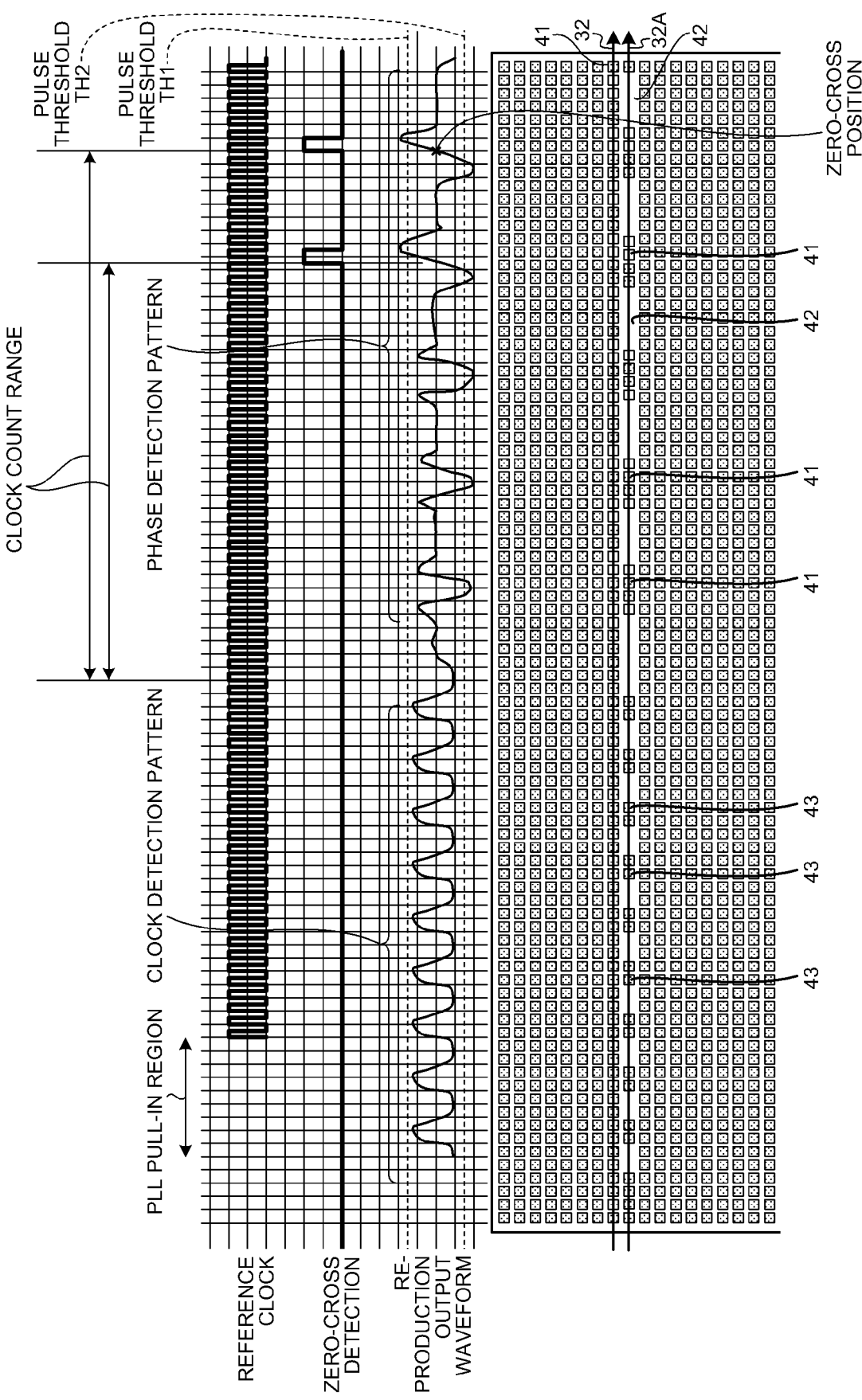
FIG. 12 is a drawing for briefly explaining an operation of writing phase detection data in a phase-adjusting track on the BPM implemented in the HDD device.

As depicted in FIG. 12, the PLL circuit 16 starts a PLL pull-in (or lock-in) operation by reproducing data in the reference-clock obtaining dots 43 on the phase-adjusting track 32A, and then obtains a reproduction output waveform of a clock detection pattern, thereby obtaining a reference clock.

Also, when a phase detection start signal is detected, as depicted in FIG. 12, the write controlling unit 52 writes the phase detection data with repeated reversals in a magnetizing direction with a two-dot period in the down-track direction from the write start position of the phase detection dots 41 on the phase-adjusting track 32A, thereby storing the write start position.

FIG. 12 is a drawing for briefly explaining an operation of writing the phase detection data in the phase-adjusting track 32A on the BPM 3A implemented in the HDD device 1A. In FIG. 12, an example is depicted in which the phase detection data is written in the phase-adjusting track 32A. For convenience in explanation, for the purpose of comparison, a case is also depicted in which the phase detection data is written with the same write timing in the normal track 32.

After the phase detection data is written, the reproduction controlling unit 53 reproduces and outputs the phase detection data written in the phase detection dots 41 from the write start position.

Also, as depicted in FIG. 8, the main controlling unit 15 includes a reproduction-output-waveform obtaining unit 54 that obtains a reproduction output waveform from the reproduction output of the phase detection data written in the phase detection dots 41 on the phase-adjusting track 32A by the reproduction controlling unit 53.

Furthermore, the main controlling unit 15A includes a maximum-output-pattern detecting unit 55 that detects an output pattern with a maximum peak at a minus side and a plus side of the reproduction output waveform obtained by the reproduction-output-waveform obtaining unit 54, and a zero-cross-position detecting unit 56 that detects a zero-cross position regarding an output pattern of the maximum peak detected by the maximum-output-pattern detecting unit 55.

When detecting a zero-cross regarding the output pattern of the maximum peak detected by the maximum-output-pattern detecting unit 55, the zero-cross-position detecting unit 56 detects a zero-cross position based on the number of clocks from the write start position obtained by the reference-clock obtaining unit 51 to the zero-cross detection.

Still further, the main controlling unit 15A includes an optimum-phase-adjusting-amount determining unit 57 that determines an optimum phase adjusting amount based on the zero-cross position detected by the zero-cross-position detecting unit 56 and the position information of the phase detection dots 41 regarding the zero-cross position managed by the position-information managing unit 13A, and a BER detecting unit 58 that detects a BER from the reproduction output from the reproduction controlling unit 53.

Figure 11:
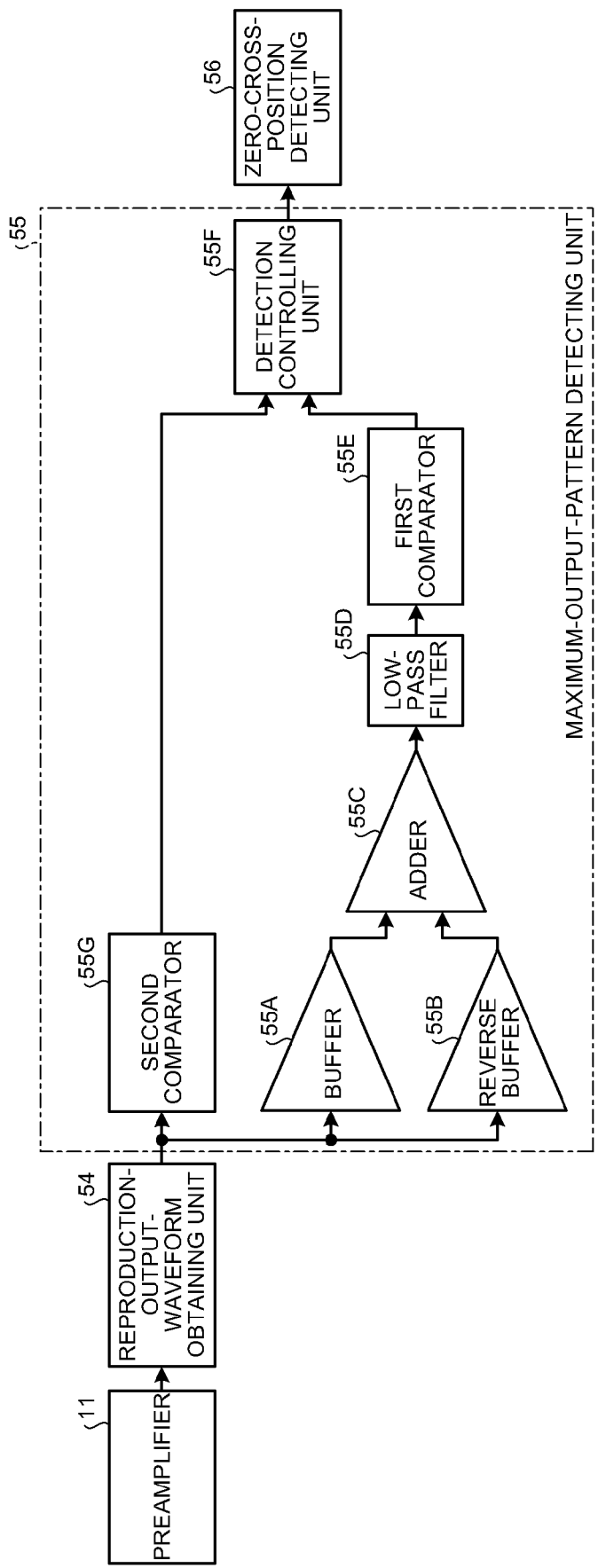
FIG. 11 is a block diagram of a schematic configuration of the inside of a maximum-output-pattern detecting unit.

FIG. 11 is a block diagram of a schematic configuration of the inside of the maximum-output-pattern detecting unit 55.

The maximum-output-pattern detecting unit 55 depicted in FIG. 11 includes, as depicted in FIG. 12, a buffer 55A that captures and outputs a peak output waveform exceeding a plus threshold TH1 on a plus side of the reproduction output waveform obtained by the reproduction-output-waveform obtaining unit 54, and a reverse buffer 55B that captures and outputs a peak output waveform exceeding a minus threshold TH2 on a minus side of the reproduction output waveform obtained by the reproduction-output-waveform obtaining unit 54.

Furthermore, the maximum-output-pattern detecting unit 55 includes an adder 55C that adds and outputs the peak output waveform on the plus side output from the buffer 55A and the peak output waveform on the minus side output from the reverse buffer 55B, a low-pass filter 55D that integrates the addition output from the adder 55C, a first comparator 55E that digitally outputs the integrated peak output waveform, and a detection controlling unit 55F that detects an output pattern with the maximum peak on a plus side and a minus side of the reproduction output waveform based on the output result from the first comparator 55E.

Still further, the maximum-output-pattern detecting unit 55 includes a second comparator 55G that detects an occurrence of noise in the reproduction output waveform. When detecting an occurrence of noise through the second comparator 55G, the detection controlling unit 55F prohibits an operation of detecting the output pattern at the maximum peak of the reproduction output waveform regarding the occurrence of noise.

Figure 13:
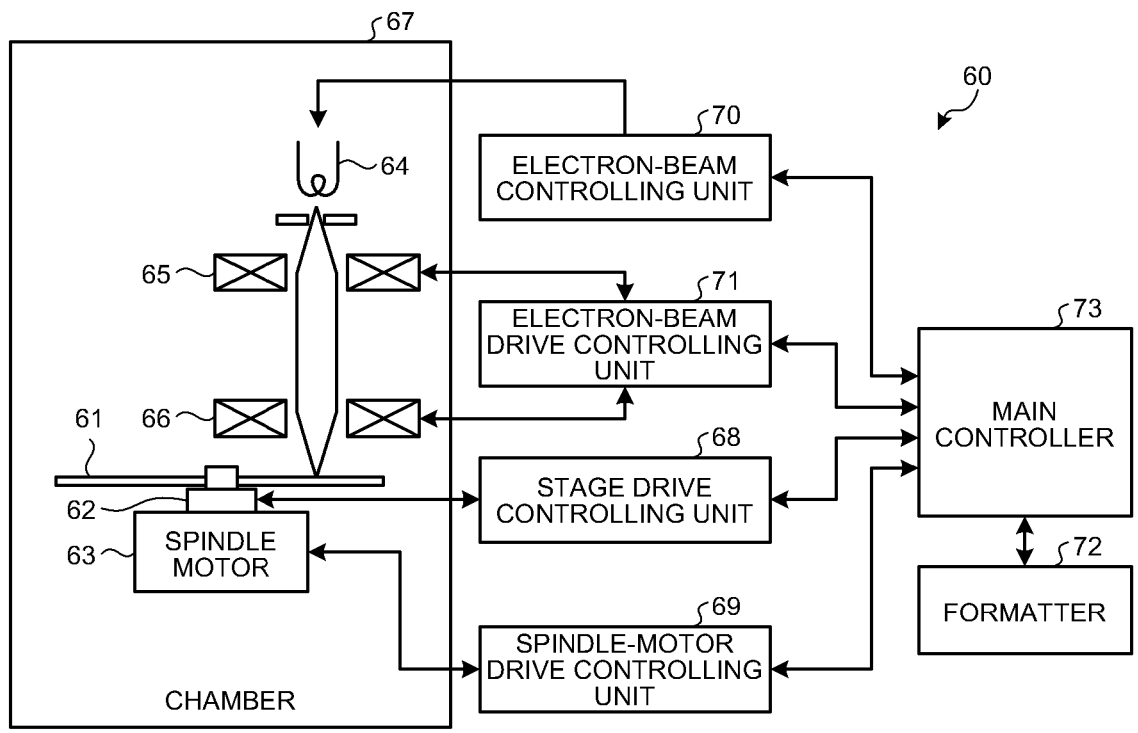
FIG. 13 is a block diagram of a schematic configuration of the inside of an electron-beam exposing device of the BPM implemented in the HDD device performs an electron-beam exposing process.

Next, a process of manufacturing the BPM 3A having a phase-adjusting track 34A disposed therein is explained. FIG. 13 is a block diagram of a schematic configuration of the inside of an electron-beam exposing device 60 that performs an electron-beam exposing process with respect to the BPM 3A implemented in the HDD device 1A.

The electron-beam exposing device 60 depicted in FIG. 13 includes an X-Y stage 62 moving over a disk 61 in vertical and horizontal directions (X-axis and Y-axis directions), a spindle motor 63 that drives the disk 61 on the X-Y stage 62 for rotation at a predetermined rotation speed, an electron-beam source 64 that outputs an electron beam, an electron-beam adjusting system 65 that adjusts the electron beam from the electron-beam source 64 in the tracking direction, and an electron-beam converging system 66 that adjust the electron beam from the electron-beam source 64 in a focusing direction.

Here, the X-Y stage 62, the spindle motor 63, the electron-beam source 64, the electron-beam adjusting system 65, and the electron-beam converging system 66 are disposed inside a chamber 67 at 10-4 pascals of vacuum.

Also, the electron-beam exposing device 60 includes a stage drive controlling unit 68 that drives and controls the X-Y stage 62, a spindle-motor drive controlling unit 69 that drives and controls the spindle motor 63, an electron-beam controlling unit 70 that drives and controls the electron-beam source 64, and an electron-beam drive controlling unit 71 that drives and controls the electron-beam adjusting system 65 and the electron-beam converging system 66.

The electron-beam exposing device 60 includes a formatter 72 that manages arrangement information (exposure control information) of the magnetic dots 31 on the tracks 32 and the phase detection dots 41 on the phase-adjusting track 32A on the disk 61, and a main controller 73 that controls the entire electron-beam exposing device 60.

Figure 14:
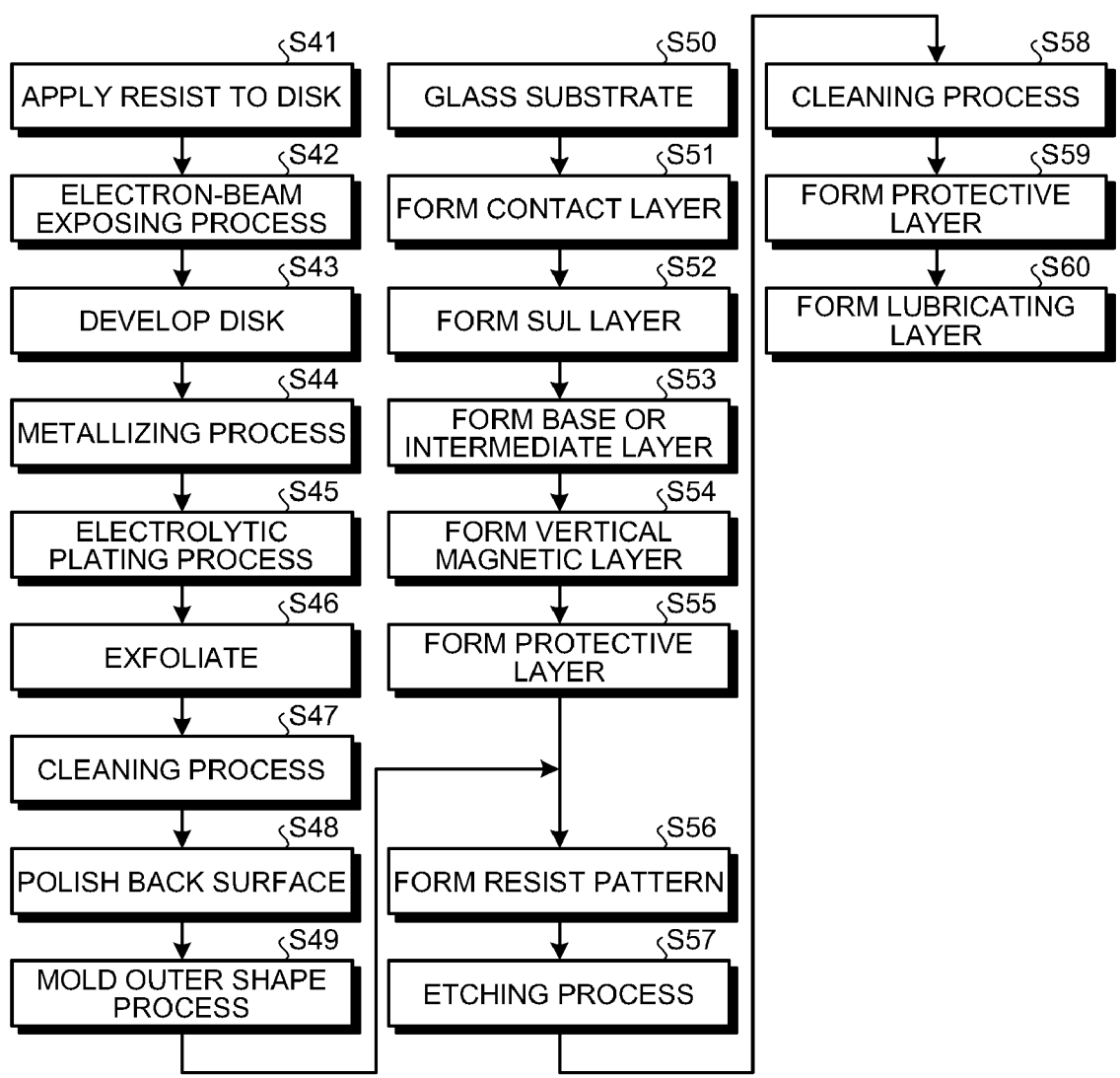
FIG. 14 is a flowchart of a process operation of a manufacturing device involving the BPM.

FIG. 14 is a flowchart of a process operation of a manufacturing device involving the BPM 3A.

In FIG. 14, the manufacturing device applies a resist having a thickness of 5 to 10 nanometers onto the disk 61 made of glass precisely polished (Step S41), and forms a pattern including the magnetic dots 31 and the phase detection dots 41 on the disk 61 with the use of the electron-beam exposure by the electron-beam exposing device 60 (Step S42).

Figure 15:
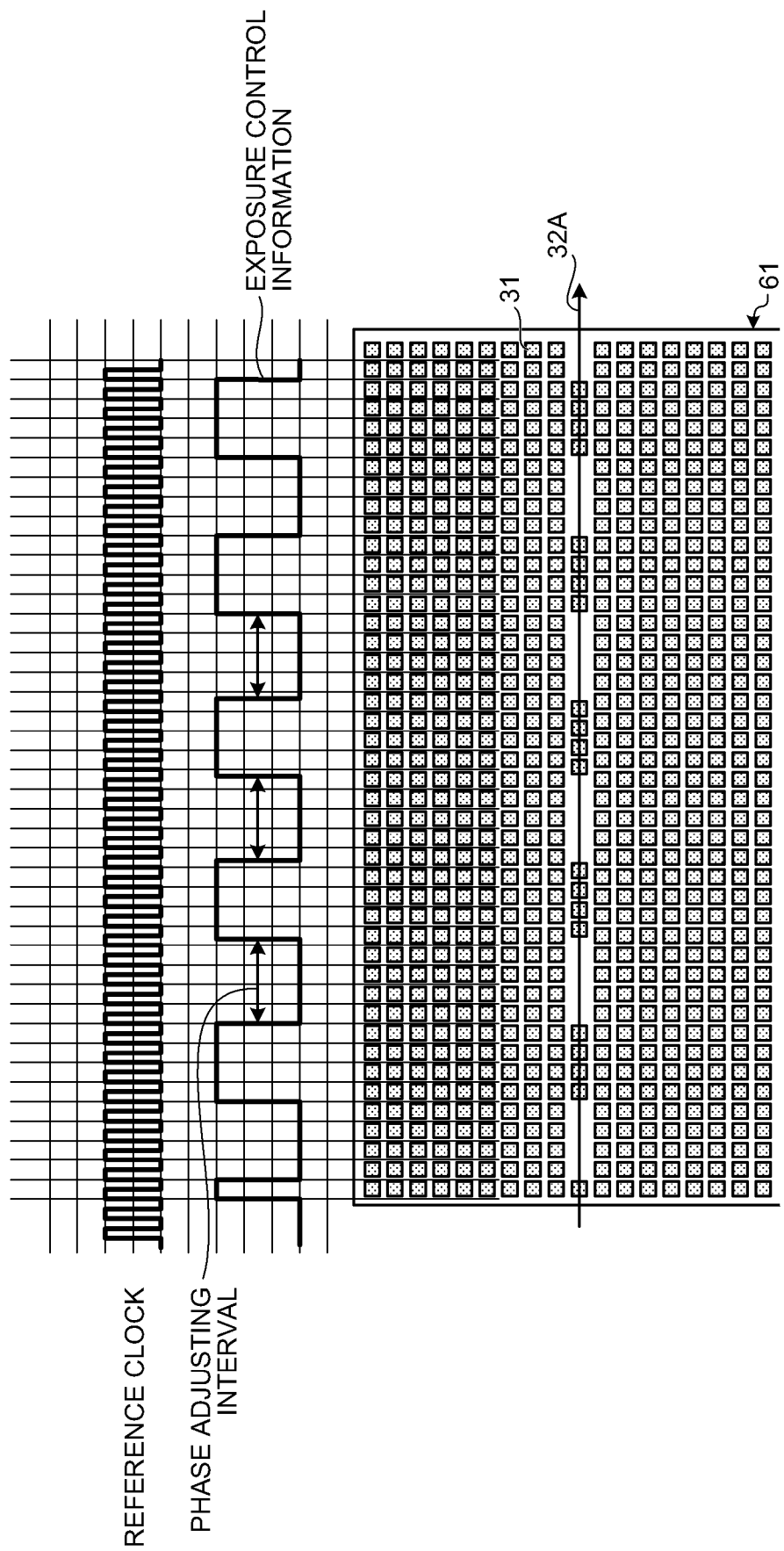
FIG. 15 is a drawing for briefly explaining an exposure format of the phase-adjusting track of the BPM.

As depicted in FIG. 15, based on a phase-adjusting space in the exposure control information from the formatter 72, the main controller 73 of the electron-beam exposing device 60 causes electron beams to be converged to a spot size of ten to several tens of nanometers on the disk 61 on which the resist layer is formed. At this time, the main controller 73 performs an exposing process by causing the disk 61 to rotate by the spindle motor and adjusting an exposure radius position of the disk 61 on the X-Y stage 62.

Here, at the time of exposure, based on the phase-adjusting space in the exposure control information from the formatter 72, the position information and the exposure amount of the disk 61 are adjusted. As a result, on the disk 61, a pattern of not only the tracks 32 but also the phase-adjusting track 32A including the phase detection dots 41 and the blank bits 42 is formed.

Also, the manufacturing device develops the disk 61 subjected to the electron-beam exposing process (Step S43) and, after disk development, performs a metallizing process in which a metal film is formed through sputtering (Step S44). Then, the manufacturing device performs an electrolytic plating process of forming a Ni layer having a thickness of approximately 150 micrometers on the disk 61 (Step S45).

Then, the manufacturing device exfoliates Ni from the disk 61 (Step S46), and performs a disk cleaning process for removing the resist (Step S47). Further, the manufacturing device polishes the back surface of the disk 61 through tape polishing (Step S48), and then performs an outer-shape process through mold stamping (Step S49) thereby completing the disk 61 on which a pattern including the magnetic dots 31 and the phase detection dots 41 is formed.

On the other hand, the manufacturing device places a disk-shaped glass substrate (Step S50), and forms on that glass substrate a metal contact layer including Ta or the like with high corrosion resistant and an increased adherence property to glass (Step S51). On that contact layer, a SUL (soft magnetic under layer) layer is formed (Step S52). The SUL layer assists writing through the magnetic head unit 4.

Still further, the manufacturing device forms a base layer or an intermediate layer on the SUL layer (Step S53) and forms a vertical (or perpendicular) magnetic layer on that base layer or intermediate layer (Step S54). As the vertical magnetic layer, a conventional granular layer made of $CoCrPt-SiO_2$ or the like can be used. Here, it is assumed that a multi-film layer made of, for example, Fe/Pt or Co/Pd, with a large vertical magnetic anisotropy without precipitation (or deposition) of oxides in a grain boundary is used.

The manufacturing device then forms a protective layer made of metal, such as Ta, having a thickness on the order of 5 nanometers (Step S55), thereby completing a vertical magnetic recording medium before pattern formation.

Then, the manufacturing device uses the disk 61 having formed thereon the pattern including the magnetic dots 31 and the phase detection dots 41 to forms a resist pattern on the vertical magnetic layer of the vertical magnetic recording medium before pattern formation through ultra-violet (UV)-nano printing (Step S56).

Then, the manufacturing device forms an asperity pattern on the vertical magnetic layer through etching (Step S57), and then performs a cleaning process for removing the resist (Step S58).

Then, after the cleaning process, the manufacturing device forms a protective layer made of carbon or the like (Step S59), and then forms a lubricating layer by applying a lubricating material over the protective layer (Step S60) thereby completing the BPM 3A.

Here, it is assumed in the BPM 3A that the dot length DL of the magnetic dots 31 in the down-track direction is approximately 30 nanometers, the predetermined space DP between the magnetic dots 31 is approximately 15 nanometers, the dot width DW of the magnetic dots 31 in the cross-track direction is approximately 40 nanometers, and a space between the magnetic dots 31 between the tracks 32 is approximately 15 nanometers.

Figure 16:
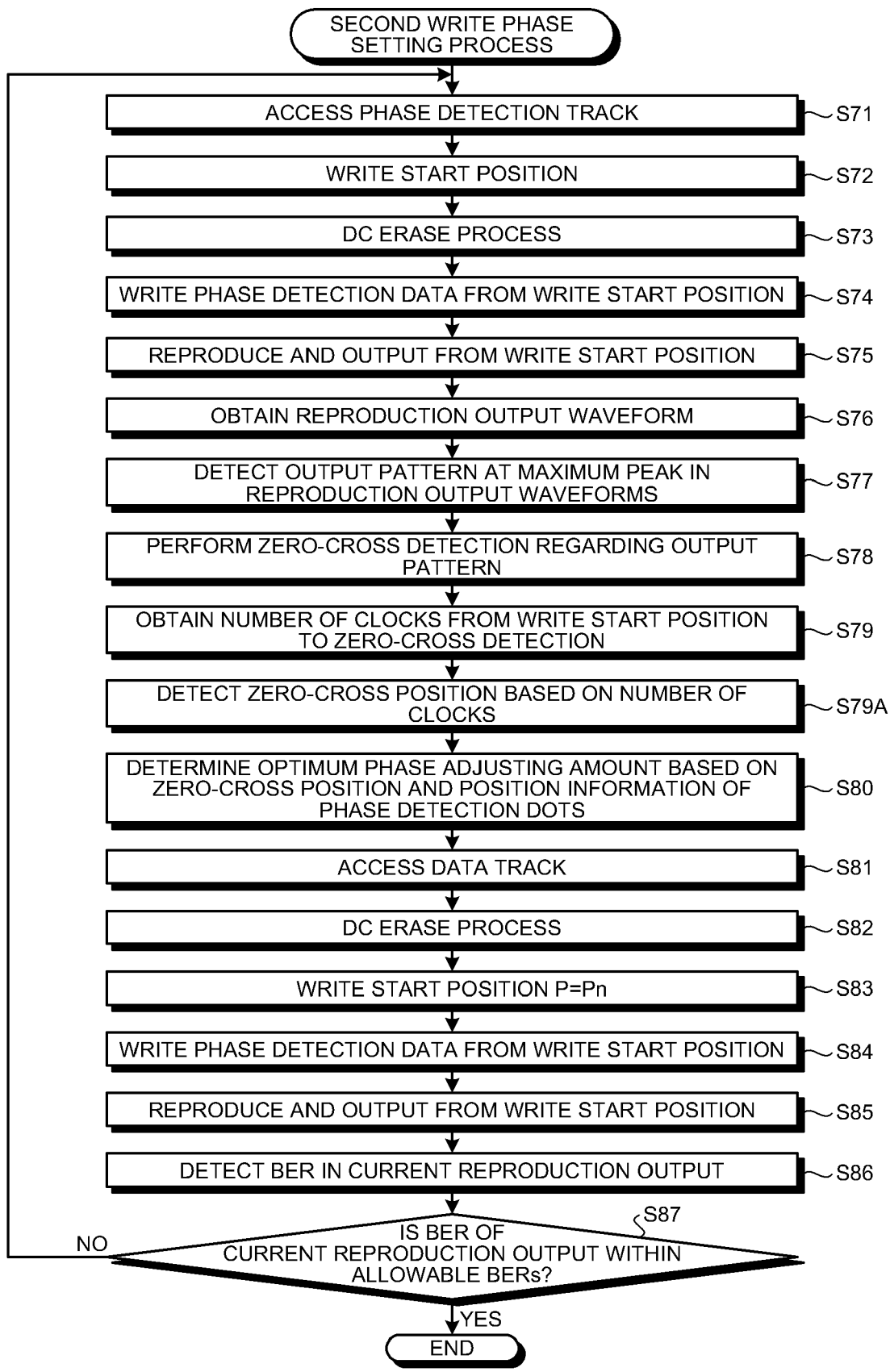
FIG. 16 is a flowchart of a process operation of a control circuit involving a second write phase setting process.
Figure 17:
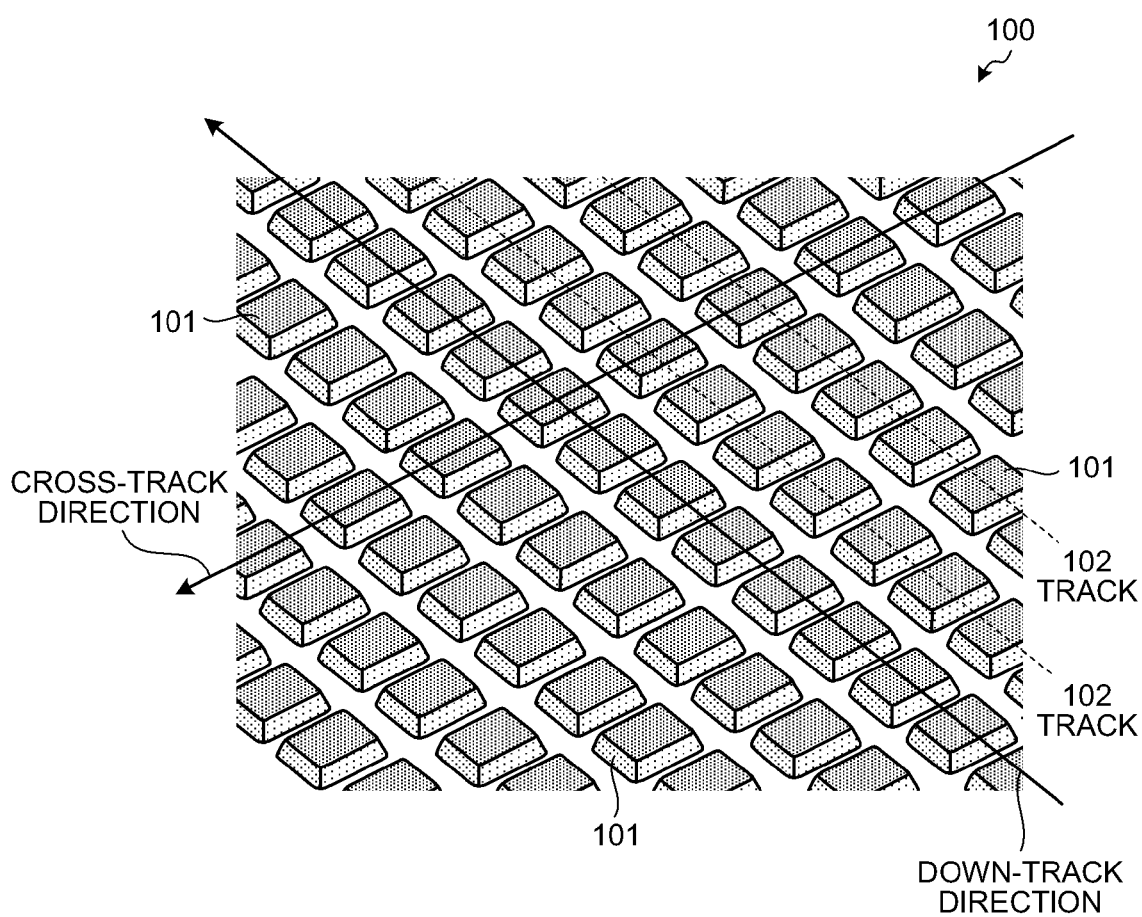
FIG. 17 is a schematic drawing for briefly explaining a track structure of a general BPM.

Next, the operation of the HDD device 1A according to the second embodiment is explained. FIG. 16 is a flowchart of a process operation of a control circuit 8A involving a second write phase setting process.

In the second write phase setting process depicted in FIG. 16, after the phase detection data is written in the phase-adjusting track 32A of the tracks 32 on the BPM 3A, an optimum phase-adjusting amount is determined from the phase detection data written on the phase detection dots 41. Based on the determined optimum phase-adjusting amount, the phase of the write timing of the magnetic head unit 4 is matched.

In FIG. 16, when a phase-detection start signal is detected, the write controlling unit 52 in the main controlling unit 15A of the control circuit 8A accesses the phase-adjusting track 32A of the tracks 32 based on a servo patter on the BPM 3A (Step S71).

It is assumed herein that the setting environment of the HDD device 1A is such that the number of revolutions is 5400 revolutions per minute, the radius position is 19.68 millimeters, the peripheral speed is 11.13 m/sec, the skew angle is 0 degrees, and the recording frequency is 12.7 MFluxChange/sec.

When setting a write start position of the magnetic head unit 4 on the phase-adjusting track 32A (Step S72) the write controlling unit 52 performs a DC erase process of making a direction of magnetizing the magnetic dots 31 in one direction (magnetic flux upward or magnetic flux downward) from the write start position (Step S73).

Upon performing the DC erase process, the write controlling unit 52 writes phase detection data on the phase detection dots 41 from the write start position (Step S74). Here, the phase detection data is data in which the direction of magnetizing the magnetic dots 31 is repeatedly reversed with a two-dot period, as depicted in FIG. 12.

When the write controlling unit 52 ends the operation of writing the phase detection data from the write start position, the reproduction controlling unit 53 reproduces and outputs the phase detection data written on the phase detection dots 41 from the write start position (Step S75).

The reproduction-output-waveform obtaining unit 54 then obtains a reproduction output waveform from the reproduction output of the phase detection data written on the phase detection dots 41 (Step S76).

The maximum-output-pattern detecting unit 55 detects an output pattern with a maximum peak on a plus side and a minus side of the reproduction output waveform obtained by the reproduction-output-waveform obtaining unit 54 (Step S77).

When the output pattern at the maximum peak is detected by the maximum-output-pattern detecting unit 55, the zero-cross-position detecting unit 56 detects a zero-cross regarding the output pattern (Step S78).

When detecting a zero-cross of the output pattern, the zero-cross-position detecting unit 56 obtains the number of reference clocks from the write start position to the zero-cross detection (Step S79), and detects a zero-cross position based on the number of clocks from the write start position to the zero-cross detection (Step S79A).

The optimum-phase-adjusting-amount determining unit 57 determines an optimum phase-adjusting amount based on the zero-cross position and the position information of the phase detection dots 41 regarding the zero-cross position managed by the position-information managing unit 13A (Step S80).

Upon determining the optimum phase-adjusting amount, the optimum-phase-adjusting-amount determining unit 57 accesses the track 32 on the BPM 3A (Step S81). Based on the optimum phase-adjusting amount, the phase of the write timing of the magnetic head unit 4 is matched, and an DC erase process of making the direction of magnetizing the magnetic dots 31 in one direction from the write start position is performed (Step S82).

Upon performing the DC erase process, the write controlling unit 52 sets the write start position as a current write start position Pn (Step S83), and then writes the phase detection data from that write start position (Step S84).

Furthermore, when the operation of writing the phase detection data from the write start position ends, the reproduction controlling unit 53 reproduces and outputs the phase detection data written in the write start position (Step S85).

The BER detecting unit 58 detects a BER of the reproduction output of the phase detection data written in the write start position (Step S86).

The write controlling unit 52 then determines whether the BER of the current reproduction output is within allowable BERs (Step S87). When the BER of the current reproduction output is within allowable BERs (Yes at Step S87), the write controlling unit 52 ends the process operation depicted in FIG. 16.

When the BER of the current reproduction output is not within allowable BERs (No at Step S87), the write controlling unit 52 proceeds to Step S71 to access the phase-adjusting track 32A for determining an optimum phase-adjusting amount again.

In the second write phase setting process depicted in FIG. 16, after the phase detection data is written in the phase-adjusting track 32A, the reproduction output waveform of the phase detection data written in the phase detection dots 41 is obtained with the reproduction timing of the magnetic head unit 4 being matched with the write start position on the phase-adjusting track 32A. Of the obtained reproduction output waveform, an output pattern at the maximum peak is detected, and a zero-cross position regarding the output pattern is detected. Based on the zero-cross position and the position information of the phase detection dots 41 regarding the zero-cross position, an optimum phase-adjusting amount for matching the phase of the write timing of the magnetic head unit 4 with respect to the magnetic dots 31 is determined. Therefore, based on the optimum phase-adjusting amount, a phase shift of the write timing with respect to the magnetic dots 31 on the BPM 3A can be resolved, thereby increasing write accuracy.

In the second embodiment, the phase-adjusting track 32A is disposed on the BPM 3A. On the phase-adjusting track 32A, the phase detection dots 41 and the blank bits 42 providing a predetermined phase difference to next successive phase detection dots 41 are alternately disposed in a successive manner. After the phase detection data is written in the phase-adjusting track 32A, the reproduction output waveform of the phase detection data written in the phase detection dots 41 is obtained with the reproduction timing of the magnetic head unit 4 being matched with the write start position on the phase-adjusting track 32A. Of the obtained reproduction output waveform, an output pattern at the maximum peak is detected, and a zero-cross position regarding the output pattern is detected. Based on the zero-cross position and the position information of the phase detection dots 41 regarding the zero-cross position, an optimum phase-adjusting amount for matching the write timing of the magnetic head unit 4 with respect to the magnetic dots 31 is determined. As a result, in the second embodiment, such a process as required in the first embodiment as sequentially shifting the write start position and writing and reproducing the phase detection data for each write start position obtained through sequential shifting is not required. In the second embodiment, an optimum phase-adjusting amount is determined with writing and reproduction of the phase detection data once and, based on this optimum phase-adjusting amount, a phase shift of the write timing with respect to the magnetic dots 31 on the BPM 3A is resolved, thereby increasing write accuracy.

In the second embodiment, the phase detection dots 41 are formed of four magnetic dots 31, and the blank bits 42 are formed having the distance W3 obtained by adding the distance W1 corresponding to the length of the phase detection dots 41 and the distance W2 corresponding to ⅓ of the dot length DL of the magnetic dots 31. However, similar effects can be achieved even when the lengths of the phase detection dots 41 and the blank bits 42 are changed as appropriate as long as conditions are satisfied such that the number of magnetic dots forming the phase detection dots 41 is m (m≧2) and the length of the blank bits 42 is (m+n/N)×(DL+DP) where 1≦n<N.

In the foregoing, while the embodiments of the present invention have been explained, the technical idea of the present invention is not meant to be restricted by these embodiments, and further various different embodiments can be implemented without deviating from the range of the technical idea explained in the claims. Also, the effects explained in the embodiments are not meant to be restrictive.

Also, among the processes explained in the embodiments above, all or part of the processes explained as being automatically performed may be manually performed. Conversely, all or part of the processes explained as being manually performed may be automatically performed. In addition, the process procedure, the control procedure, specific names, and information including various data and parameters explained in the present embodiments can be arbitrarily changed unless otherwise specified.

Furthermore, each component depicted is conceptual in function, and is not necessarily physically configured as depicted. That is, the specific patterns of the components are not meant to be restricted to those depicted in the drawings.

Still further, all or arbitrary part of various process functions performed in each component can be achieved by a central processing unit (CPU) (or a microcomputer, such as micro processing unit (MPU) or micro controller unit (MCU)) and a program analyzed and executed on that CPU (or microcomputer, such as MPU or MCU), or can be achieved as hardware with a wired logic.

In the disclosed device, a phase-adjusting track is provided to a magnetic storage medium, such as a BPM. Phase-detecting dots and blank bits providing a predetermined phase difference in a down-track direction along the phase-adjusting track are alternately disposed. After phase detection data is written in the phase-adjusting track, a reproduction output waveform of the phase detection data written in the phase detection dots is obtained in accordance with a reproduction timing of a magnetic head unit at a write start position on the phase-adjusting track. Of the reproduction output waveform, an output pattern at a maximum peak is detected. A zero-cross position regarding the output pattern is then detected. Based on the zero-cross position and the position information of the phase-detecting dots, an optimum phase-adjusting amount for matching a phase of the write timing of the magnetic head unit with respect to the magnetic dots is determined. As a result, in the disclosed device, based on the optimum phase-adjusting amount, a phase shift in write timing with respect to the magnetic dots on the BPM can be resolved, thereby increasing write accuracy.

In the disclosed medium, a phase-adjusting track is provided to a magnetic storage medium, such as a BPM. Phase-detecting dots and blank bits providing a predetermined phase difference in a down-track direction along the phase-adjusting track are alternately disposed. As a result, in a storage device having the disclosed medium implemented thereon, after phase detection data is written in the phase-adjusting track, a reproduction output waveform of the phase detection data written in the phase detection dots is obtained in accordance with a reproduction timing of a magnetic head unit at a write start position on the phase-adjusting track. Of the reproduction output waveform, an output pattern at a maximum peak is detected. A zero-cross position regarding the output pattern is then detected. Based on the zero-cross position and the position information of the phase-detecting dots, an optimum phase-adjusting amount for matching a phase of the write timing of the magnetic head unit with respect to the magnetic dots is determined. Based on the optimum phase-adjusting amount, a phase shift in write timing with respect to the magnetic dots on the BPM can be resolved, thereby increasing write accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A phase adjusting device comprising:
a rotation drive controlling unit that drives a magnetic storage medium for rotation, the magnetic storage medium having a plurality of magnetic dots disposed along a down-track direction in a magnetically separated manner and phase-detecting dots and blank bits alternately disposed along a phase-adjusting track provided between adjacent lines of the magnetic dots in a cross-track direction to provide a predetermined phase difference in the down-track direction;
a magnetic-head drive controlling unit that adjusts and controls a write timing and a reproduction timing of a magnetic head unit with respect to the magnetic dots of the magnetic storage medium;
a position-information managing unit that manages position information of the phase-detecting dots in the phase-adjusting track;
a write controlling unit that, upon detecting a phase-detection start signal, starts writing of phase detection data by repeatedly reversing a magnetizing direction with a predetermined period of dot counts on the phase-adjusting track via the magnetic head unit and manages a write start position thereof;
a reproduction controlling unit that, after the phase detection data is written, reproduces and outputs the phase detection data written in the phase-detecting dots on the phase-adjusting track in accordance with a reproduction timing of the magnetic head unit at the write start position;
a reproduction-output-waveform obtaining unit that obtains a reproduction output waveform of the phase detection data written in the phase-detecting dots on the phase-adjusting track reproduced and output by the reproduction controlling unit;
a maximum-output-pattern detecting unit that detects an output pattern with a maximum peak at a minus side and a plus side of the reproduction output waveform obtained by the reproduction-output-waveform obtaining unit;

a zero-cross-position detecting unit that detects a zero-cross position regarding the output pattern of the maximum peak detected by the maximum-output-pattern detecting unit; and an optimum-phase-adjustment-amount determining unit that determines an optimum phase-adjusting amount for matching a phase of the write timing of the magnetic head unit with respect to the magnetic dots of the magnetic storage medium based on the zero-cross position detected by the zero-cross-position detecting unit and the position information of the phase-detecting dots managed by the position-information managing unit.

2. The phase adjusting device according to claim 1, further comprising a reference-clock obtaining unit that obtains a reference clock from reproduction output, wherein upon detecting a zero-cross regarding the output pattern of the maximum peak detected by the maximum-output-pattern detecting unit, the zero-cross-position detecting unit detects the zero-cross position based on the number of reference clocks from the write start position to the detection of the zero-cross.

3. A magnetic storage medium comprising:

a plurality of magnetic dots disposed along a down-track direction in a magnetically separated manner; and phase-detecting dots and blank bits alternately disposed along a phase-adjusting track provided between adjacent lines of the magnetic dots in a cross-track direction to provide a predetermined phase difference in the down-track direction.

4. The magnetic storage medium according to claim 3, wherein the phase-detecting dots are formed of a predetermined number of magnetic dots disposed each with the predetermined space, and with a distance obtained by adding a distance corresponding to a length of the phase-detecting dots in the down-track direction and a distance corresponding to a predetermined fraction of the dot length of the magnetic dots in the down-track direction being taken as a length of the blank bits in the down-track direction, the blank bits provide a predetermined phase difference of the distance corresponding to the predetermined fraction of the dot length of the magnetic dots to next successive phase-detecting dots in the down-track direction.

5. The magnetic storage medium according to claim 4, wherein the phase-detecting dots are formed of four magnetic dots disposed each with the predetermined space, and with a distance obtained by adding a distance corresponding to a length of the phase-detecting dots formed of four magnetic dots disposed each with the predetermined space and a distance corresponding to one-third of the dot length of the magnetic dots being taken as a length of the blank bits in the down-track direction, the blank bits provide a predetermined phase difference of the distance corresponding to one-third of the dot length of the magnetic dots to next successive phase-detecting dots in the down-track direction.

6. A storage device comprising:

a magnetic storage medium having a plurality of magnetic dots disposed along a down-track direction in a magnetically separated manner and phase-detecting dots and blank bits alternately disposed along a phase-adjusting track provided between adjacent lines of the magnetic dots in a cross-track direction to provide a predetermined phase difference in the down-track direction;

a magnetic head unit that writes data in the magnetic dots of the magnetic storage medium and reproduces the data from the magnetic dots of the magnetic storage medium;

a rotation drive controlling unit that drives the magnetic storage medium for rotation; and a magnetic-head drive controlling unit that adjusts and controls a write timing and a reproduction timing of the magnetic head unit with respect to the magnetic dots of the magnetic storage medium.

7. The storage device according to claim 6, further comprising:

a position-information managing unit that manages position information of the phase-detecting dots in the phase-adjusting track;

a write controlling unit that, upon detecting a phase-detection start signal, starts writing of phase detection data by repeatedly reversing a magnetizing direction with a predetermined period of dot counts on the phase-adjusting track via the magnetic head unit and manages a write start position thereof;

a reproduction controlling unit that, after the phase detection data is written, reproduces and outputs the phase detection data written in the phase-detecting dots on the phase-adjusting track in accordance with a reproduction timing of the magnetic head unit at the write start position;

a reproduction-output-waveform obtaining unit that obtains a reproduction output waveform of the phase detection data written in the phase-detecting dots on the phase-adjusting track reproduced and output by the reproduction controlling unit;

a maximum-output-pattern detecting unit that detects an output pattern with a maximum peak at a minus side and a plus side of the reproduction output waveform obtained by the reproduction-output-waveform obtaining unit;

a zero-cross-position detecting unit that detects a zero-cross position regarding the output pattern of the maximum peak detected by the maximum-output-pattern detecting unit; and an optimum-phase-adjustment-amount determining unit that determines an optimum phase-adjusting amount for matching a phase of the write timing of the magnetic head unit with respect to the magnetic dots of the magnetic storage medium based on the zero-cross position detected by the zero-cross-position detecting unit and the position information of the phase-detecting dots managed by the position-information managing unit.

8. The storage device according to claim 6, wherein the phase-detecting dots are formed of a predetermined number of magnetic dots disposed each with the predetermined space, with a distance obtained by adding a distance corresponding to a length of the phase-detecting dots in the down-track direction and a distance corresponding to a predetermined fraction of the dot length of the magnetic dots in the down-track direction being taken as a length of the blank bits in the down-track direction, the blank bits provide a predetermined phase difference of the distance corresponding to the predetermined fraction of the dot length of the magnetic dots to next successive phase-detecting dots in the down-track direction.

* * * * *